(12) United States Patent
Penland et al.

(10) Patent No.: US 10,156,045 B2
(45) Date of Patent: Dec. 18, 2018

(54) PANEL MATS CONNECTABLE WITH INTERLOCKING AND PINNING ELEMENTS

(71) Applicant: QUALITY MAT COMPANY, Beaumont, TX (US)

(72) Inventors: Joe Penland, Beaumont, TX (US); Scott Calvert, Beaumont, TX (US); Don Couvillon, Beaumont, TX (US)

(73) Assignee: Quality Mat Company, Beaumont, TX (US)

( * ) Notice: Subject to any disclaimer, the term of this patent is extended or adjusted under 35 U.S.C. 154(b) by 0 days.

(21) Appl. No.: 15/661,400

(22) Filed: Jul. 27, 2017

(65) Prior Publication Data

US 2018/0030667 A1    Feb. 1, 2018

Related U.S. Application Data

(60) Provisional application No. 62/368,954, filed on Jul. 29, 2016, provisional application No. 62/402,391, (Continued)

(51) Int. Cl.
*E01C 9/08* (2006.01)
*E01C 5/18* (2006.01)
(Continued)

(52) U.S. Cl.
CPC .............. *E01C 9/086* (2013.01); *E01C 5/005* (2013.01); *E01C 5/18* (2013.01); *E01C 5/20* (2013.01);
(Continued)

(58) Field of Classification Search
CPC .......... E01C 5/001; E01C 3/006; E01C 9/004; E01C 9/08; E01C 2201/12;
(Continued)

(56) References Cited

U.S. PATENT DOCUMENTS 1,935,823 A    11/1933    Turner
2,819,026 A    1/1958    Leyendecker
(Continued)

FOREIGN PATENT DOCUMENTS

EP    2 733 261 A2    5/2014
WO    03/023145 A1    3/2013
WO    2014/068087 A1    5/2014

OTHER PUBLICATIONS

International Search Report and Written Opinion, Appl. No. PCT/US2017/044157, dated Nov. 29, 2017.
(Continued)

*Primary Examiner* — Abigail A Risic
(74) *Attorney, Agent, or Firm* — Winston & Strawn LLP

(57) ABSTRACT

A lightweight universal panel mat made of plastic or elastomeric material and having a first section that provides a relatively flat, textured or structured top surface to facilitate movement over the upper surface and a second section having geometry that includes a plurality of cells having top surfaces that support the first section. The mats also include first, second, third and fourth sides forming a perimeter of the mat, wherein the first and second sides include upper structures having a sloped lower surface and the third and fourth sides include lower structures having sloped upper surfaces. The sloped surfaces are configured to allow for overlapping with sloped surfaces other like mats for interlocking therewith while forming a generally flat continuous top and bottom surface of the overlapped mats. The mats may be interlocked by a fastening member which fits in aligned openings of the adjacent mats for connection therewith.

20 Claims, 26 Drawing Sheets

Related U.S. Application Data filed on Sep. 30, 2016, provisional application No. 62/402,404, filed on Sep. 30, 2016.

(51) Int. Cl.

| | |
|---|---|
| *E01C 5/20* | (2006.01) |
| *E01C 5/00* | (2006.01) |
| *E04F 11/00* | (2006.01) |
| *E01C 11/22* | (2006.01) |
| *E01C 13/04* | (2006.01) |
| *E04F 15/02* | (2006.01) |
| *E04F 15/10* | (2006.01) |
| *E04F 19/06* | (2006.01) |
| *H02G 9/02* | (2006.01) |
| *E04B 5/02* | (2006.01) |

(52) U.S. Cl.
CPC .......... *E01C 11/222* (2013.01); *E01C 13/045* (2013.01); *E04F 11/002* (2013.01); *E04F 15/02038* (2013.01); *E04F 15/02172* (2013.01); *E04F 15/02194* (2013.01); *E04F 15/105* (2013.01); *E04F 15/107* (2013.01); *E04F 19/061* (2013.01); *H02G 9/025* (2013.01); *E01C 2201/12* (2013.01); *E01C 2201/16* (2013.01); *E04B 5/023* (2013.01); *E04B 5/026* (2013.01); *E04F 2201/021* (2013.01); *E04F 2201/0505* (2013.01)

(58) Field of Classification Search
CPC ........ E01C 2201/20; E01C 5/18; E01C 9/086; E01C 5/20; E01C 2201/14; E02D 29/124; E02D 17/20
See application file for complete search history.

(56) References Cited

U.S. PATENT DOCUMENTS

| | | | |
|---|---|---|---|
| 3,603,221 A | 9/1971 | Barton et al. | |
| 4,462,712 A | 7/1984 | Penland, Sr. | |
| 4,600,336 A | 7/1986 | Waller, Jr. | |
| 4,600,337 A | 7/1986 | Sarver | |
| 4,840,825 A | 6/1989 | Aristodimou | |
| 4,875,800 A | 10/1989 | Hicks | |
| 4,889,444 A | 12/1989 | Pouyer | |
| 4,896,993 A | 1/1990 | Bohnhoff | |
| 4,973,193 A | 11/1990 | Watson et al. | |
| 5,020,937 A | 6/1991 | Pouyer | |
| 5,032,037 A | 7/1991 | Phillips et al. | |
| 5,087,149 A | 2/1992 | Waller, Jr. | |
| 5,163,776 A | 11/1992 | Pouyer | |
| 5,201,601 A | 4/1993 | Stanley et al. | |
| 5,273,373 A | 12/1993 | Pouyer | |
| 5,316,408 A | 5/1994 | Stanley et al. | |
| 5,364,204 A | 11/1994 | MacLeod | |
| 5,527,128 A * | 6/1996 | Rope | E01C 5/20 404/35 |
| 5,653,551 A | 8/1997 | Seaux | |
| 5,787,654 A | 8/1998 | Drost | |
| 5,822,944 A | 10/1998 | Penland, Sr. | |
| 6,089,784 A | 7/2000 | Arden | |
| 6,474,905 B1 | 11/2002 | Smith, Jr. et al. | |
| 6,511,257 B1 | 1/2003 | Seaux et al. | |
| 6,652,183 B2 | 11/2003 | Stasiewich et al. | |
| 6,662,508 B1 * | 12/2003 | Else | A63C 19/12 404/40 |
| 6,695,527 B2 | 2/2004 | Seaux et al. | |
| 6,945,732 B2 | 9/2005 | Renick | |
| 6,966,155 B2 * | 11/2005 | Nevison | E04F 15/105 15/238 |
| 7,114,298 B2 * | 10/2006 | Kotler | E01C 5/20 52/177 |
| 7,162,838 B2 | 1/2007 | Arden | |
| 7,303,800 B2 * | 12/2007 | Rogers | B32B 3/02 428/44 |
| 7,340,865 B2 * | 3/2008 | Vanderhoef | E04F 15/02194 52/177 |
| 7,413,374 B2 | 8/2008 | Rogers et al. | |
| 7,516,587 B2 * | 4/2009 | Barlow | A63B 69/3661 428/192 |
| 7,571,572 B2 * | 8/2009 | Moller, Jr. | E01C 5/20 404/41 |
| 7,793,471 B2 * | 9/2010 | Hill | B32B 3/10 428/33 |
| 8,071,186 B1 | 12/2011 | Quimby | |
| D667,144 S * | 9/2012 | Else | D25/158 |
| 8,341,896 B2 * | 1/2013 | Moller, Jr. | E01C 5/20 52/177 |
| 8,407,951 B2 * | 4/2013 | Haney | E01C 5/20 52/177 |
| 8,936,374 B1 * | 1/2015 | Royse | F21V 33/006 362/153 |
| 8,955,278 B1 | 2/2015 | Mills | |
| 9,133,628 B2 * | 9/2015 | Moller, Jr. | E04F 15/225 |
| 9,249,570 B2 * | 2/2016 | Jean | E04B 5/023 |
| 9,315,949 B1 | 4/2016 | Penland, Jr. et al. | |
| 9,337,586 B2 * | 5/2016 | McDowell | E01C 9/08 |
| 9,506,255 B1 | 11/2016 | Jones et al. | |
| 9,631,375 B1 * | 4/2017 | Barlow | E04F 15/187 |
| D794,225 S * | 8/2017 | Jean | D25/163 |
| 2002/0110418 A1 | 8/2002 | Renick | |
| 2004/0005430 A1 | 1/2004 | Rogers | |
| 2005/0108968 A1 | 5/2005 | Forster | |
| 2005/0224690 A1 * | 10/2005 | Hobbs | E01C 5/08 249/2 |
| 2005/0252109 A1 * | 11/2005 | Fuccella | E04F 15/10 52/177 |
| 2006/0265987 A1 * | 11/2006 | Iannone | E01C 5/20 52/384 |
| 2006/0272252 A1 * | 12/2006 | Moller, Jr. | E01C 5/20 52/384 |
| 2007/0042828 A1 | 2/2007 | Krushke, Jr. et al. | |
| 2007/0102243 A1 * | 5/2007 | Ruminski | E01C 5/20 182/222 |
| 2007/0266669 A1 * | 11/2007 | Rapaz | E01C 5/005 52/638 |
| 2008/0292397 A1 * | 11/2008 | Farney | E01C 9/086 404/32 |
| 2013/0276399 A1 * | 10/2013 | Rapaz | E04C 2/34 52/592.1 |
| 2013/0291457 A1 * | 11/2013 | Tillery | E04F 15/22 52/177 |
| 2014/0137505 A1 * | 5/2014 | Jean | E04B 5/023 52/588.1 |
| 2014/0270945 A1 * | 9/2014 | Bach | E01C 5/20 404/36 |
| 2015/0029040 A1 * | 1/2015 | McDowell | E01C 9/08 340/907 |
| 2015/0266669 A1 | 9/2015 | McDowell | |
| 2016/0312413 A1 | 10/2016 | Malmquist | |
| 2016/0340911 A1 * | 11/2016 | Jean | F16B 37/044 |
| 2017/0081862 A1 * | 3/2017 | Gu Bilmez | B29C 45/16 |
| 2017/0241084 A1 * | 8/2017 | Else | E01C 9/086 |

OTHER PUBLICATIONS

Introduction to the Mat System, Technical Bulletin, DURA-BASE Composite Mat System, vol. 5, No. 1, 2 pgs. (undated).
Composite Mat Solutions, Newpark Resources Incorporated, 1 pg., retrieved on Jun. 22, 2006. http://www.newpark.com/dynamic.php?pg=Top/Composite.
DURA-BASE Mats "Fit the Bill" for Operations in Marsh Location, SOLOCO Oilfield & Environmental Contractor, a Newpark Company, 3 pgs., retrieved on Jun. 22, 2006. http://www.solocollc.com/solco_news-detail.php?article_id=17.
BRAVO Mat System, 3 pgs., retrieved on Jun. 22, 2006. http://www.compositemat.com/products-bravo-facts_and_features.php.
The Function of Fasteners and Their Proper Use, Technical Bulletin, DURA-BASE Composite Mat System, vol. 4, No. 3, 3 pgs. (undated).

(56) References Cited

OTHER PUBLICATIONS

Bravo Mat Line is the Answer, 1 pg., retrieved on Jun. 22, 2006. http://www.compositemat.com/products-bravo-specifications.php.
DURA-BASE, Installation & Handling, 2 pgs., retrieved on Jun. 22, 2006. http://www.compositemat.com/products-durabase-installation_and_handling.php.
Mold-Base System, Protect Your Assets, 1 pg., retrieved on Jun. 22, 2006 http://www.compositemat.com/images/page_blocks/CMS_moldbase_logo.jpg.
DURA-BASE, Your Extreme Environment Access Solution, 2 pgs., retrieved on Jun. 22, 2006. http://www.compositemat.com/products-durabase-facts_and_features.php.
DURA-BASE, Measurements, 1 pg., retrieved on Jun. 22, 2006. http://www.compositemat.com/products-durabase-specifications.php.
DURA-BASE, Your Extreme Environment Access Solution, 1 pg., retrieved on Jun. 22, 2006. http://www.compositemat.com/products-durabase.php.
Composite mat image, 1 pg., retrieved on Jun. 22, 2006. http://www.compositemat.com/images/page_blocks/body-sample-bravo_05_10_25_19_22 . . . .

* cited by examiner

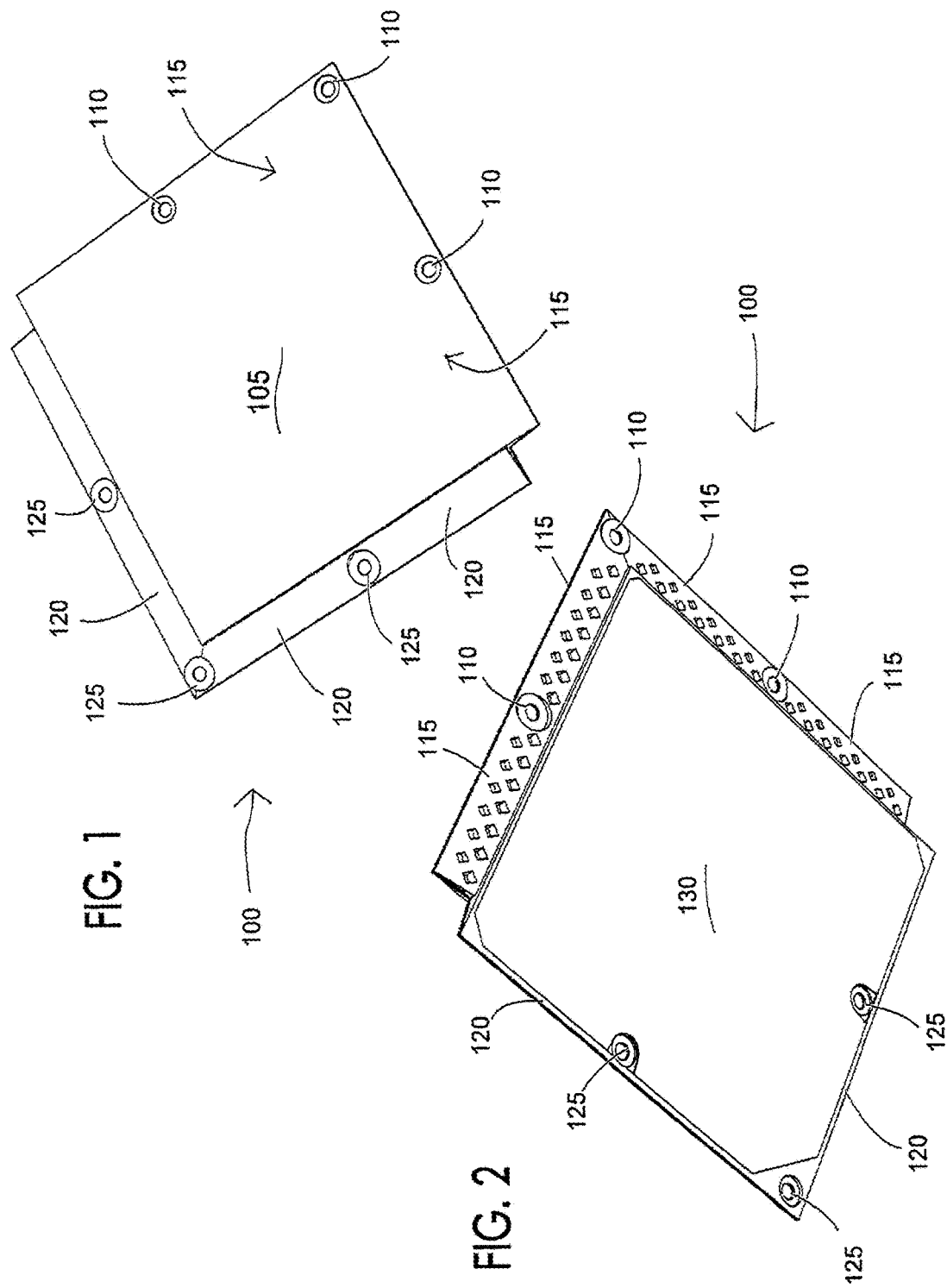

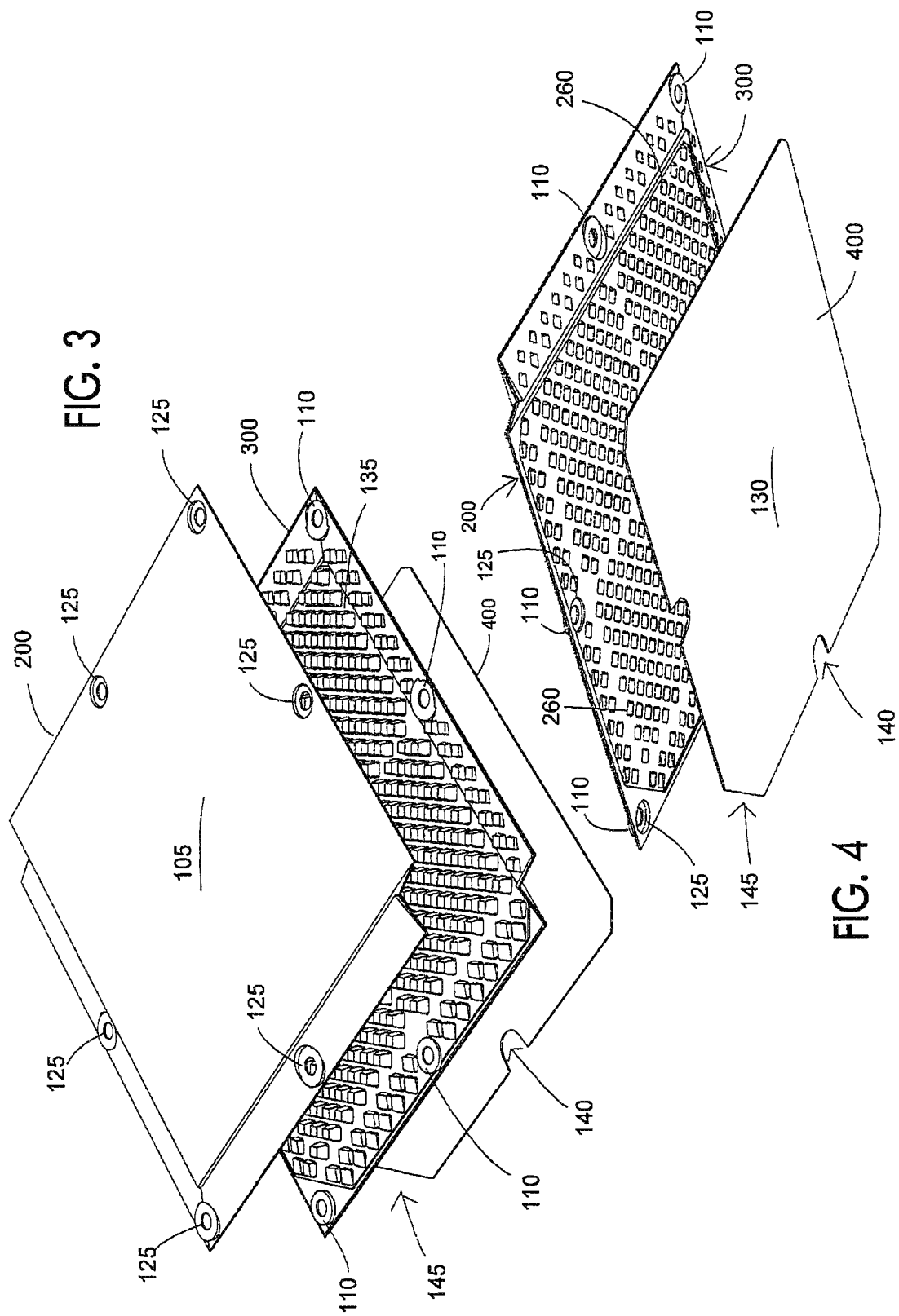

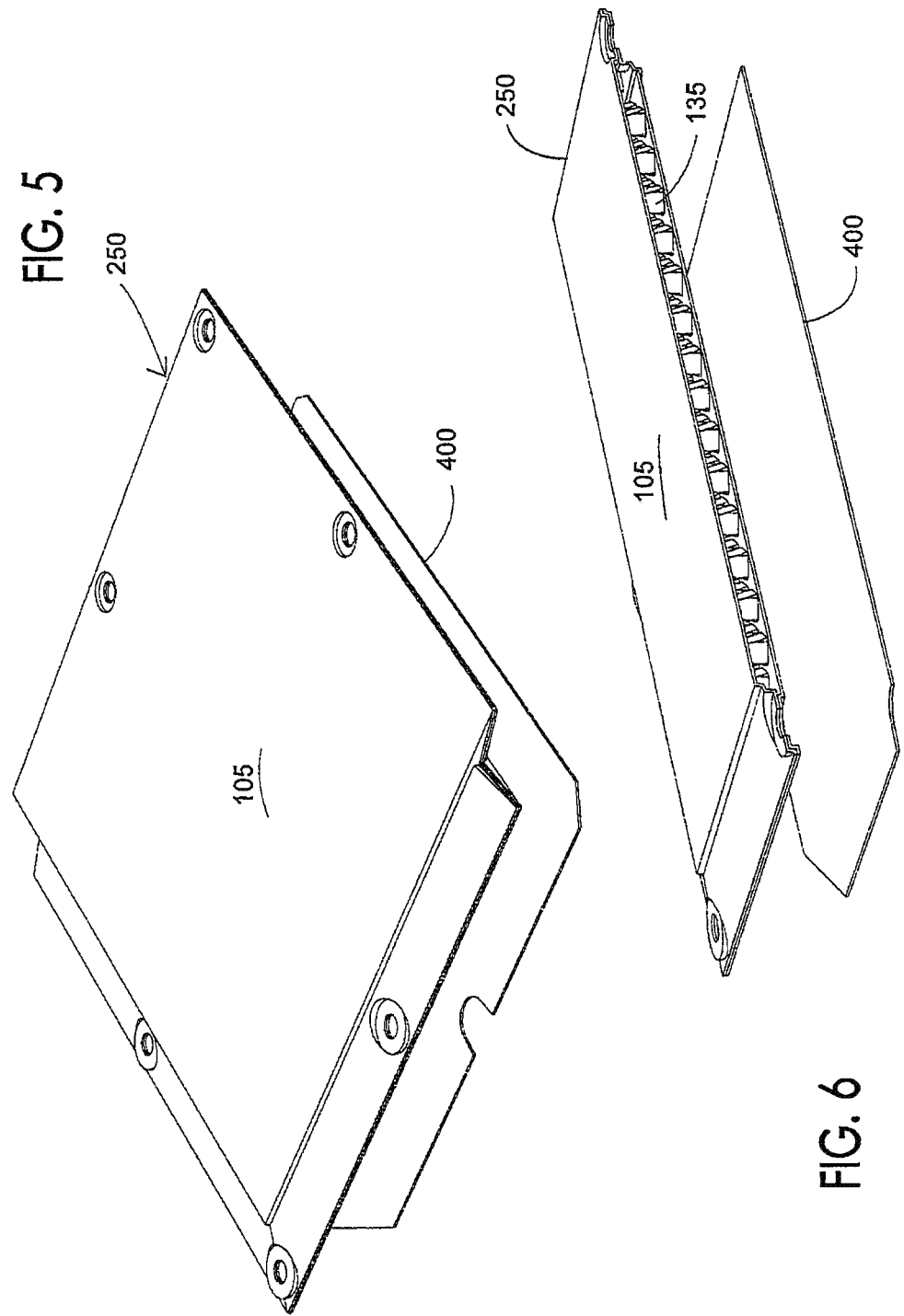

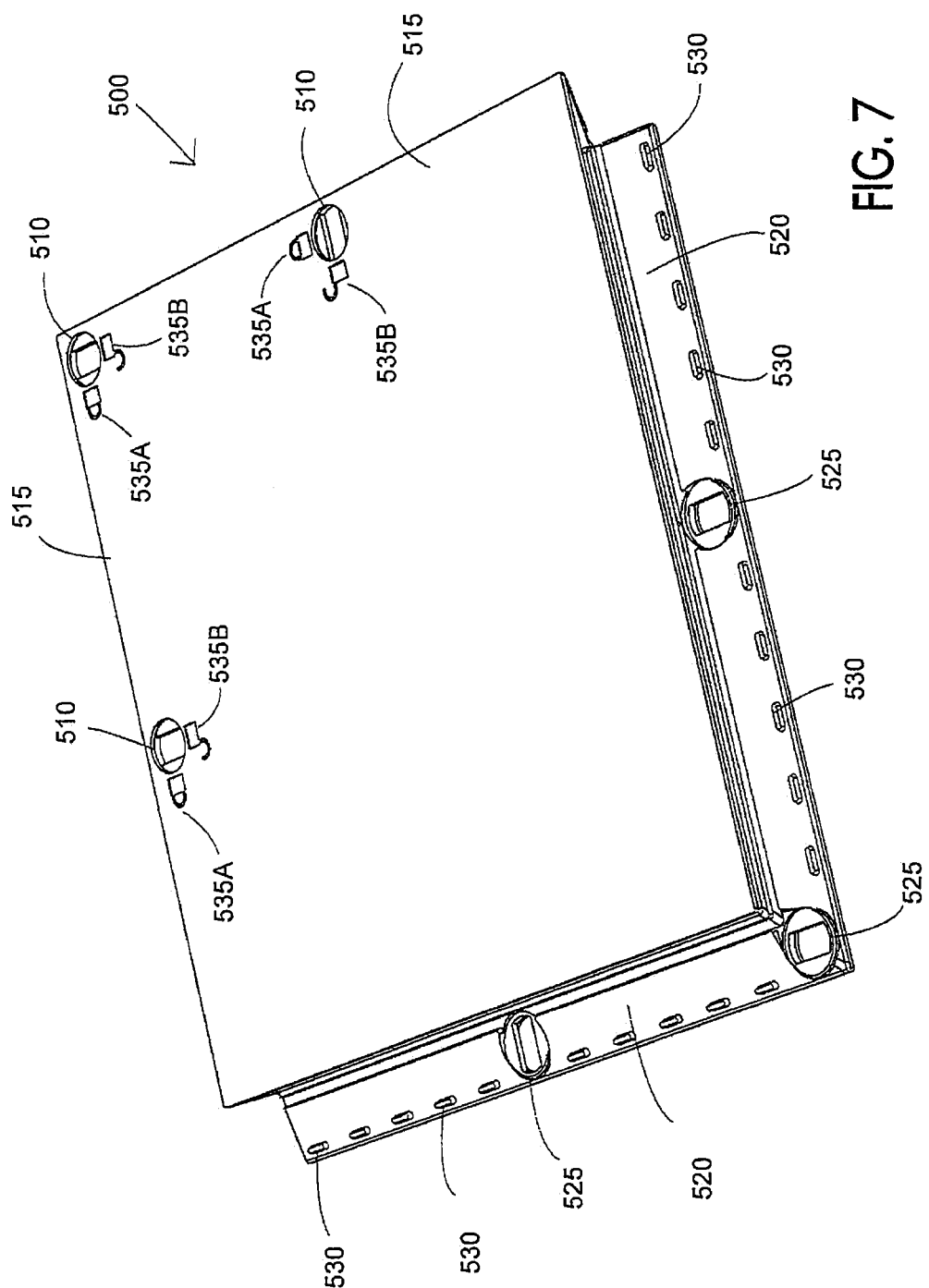

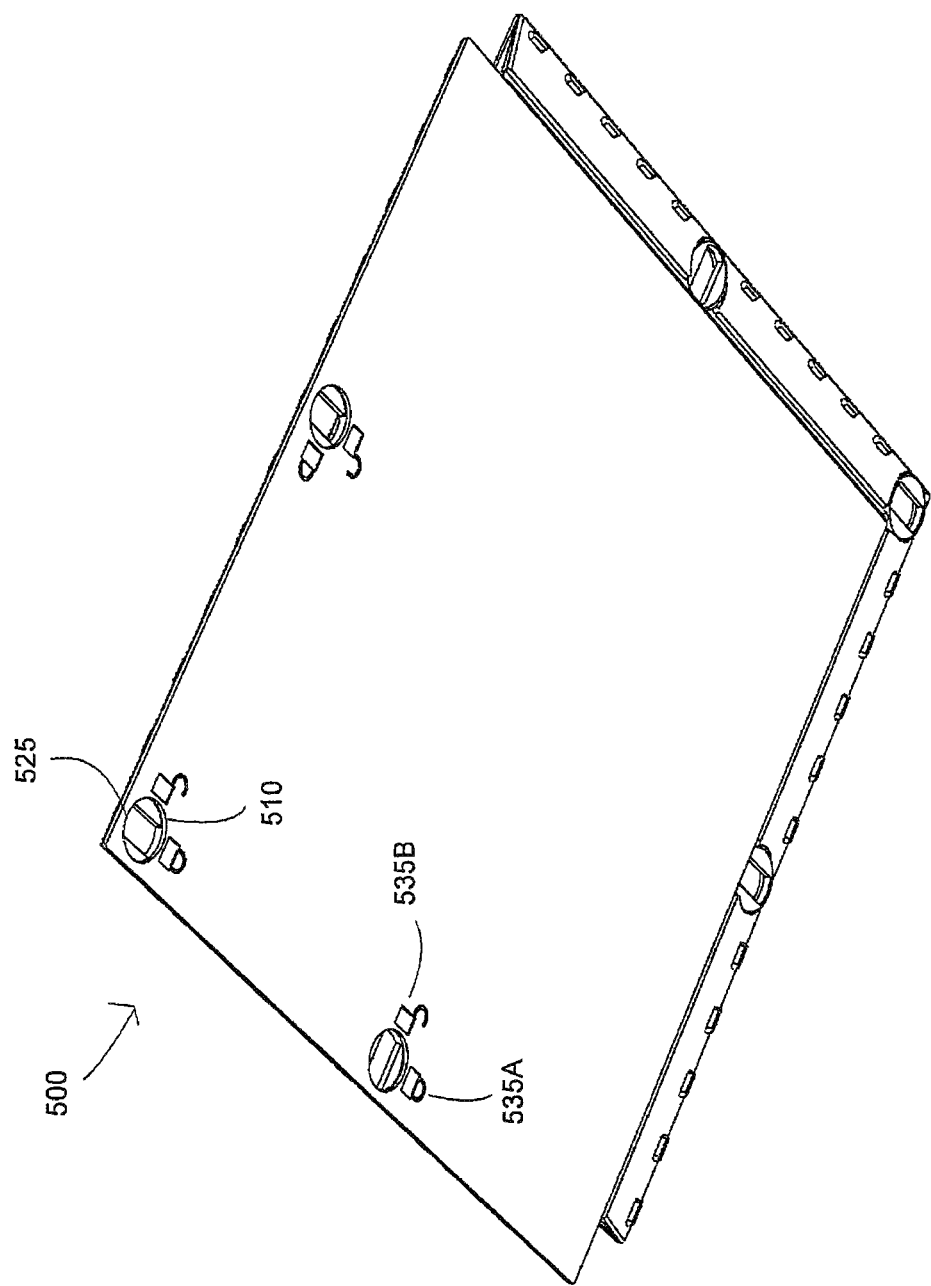

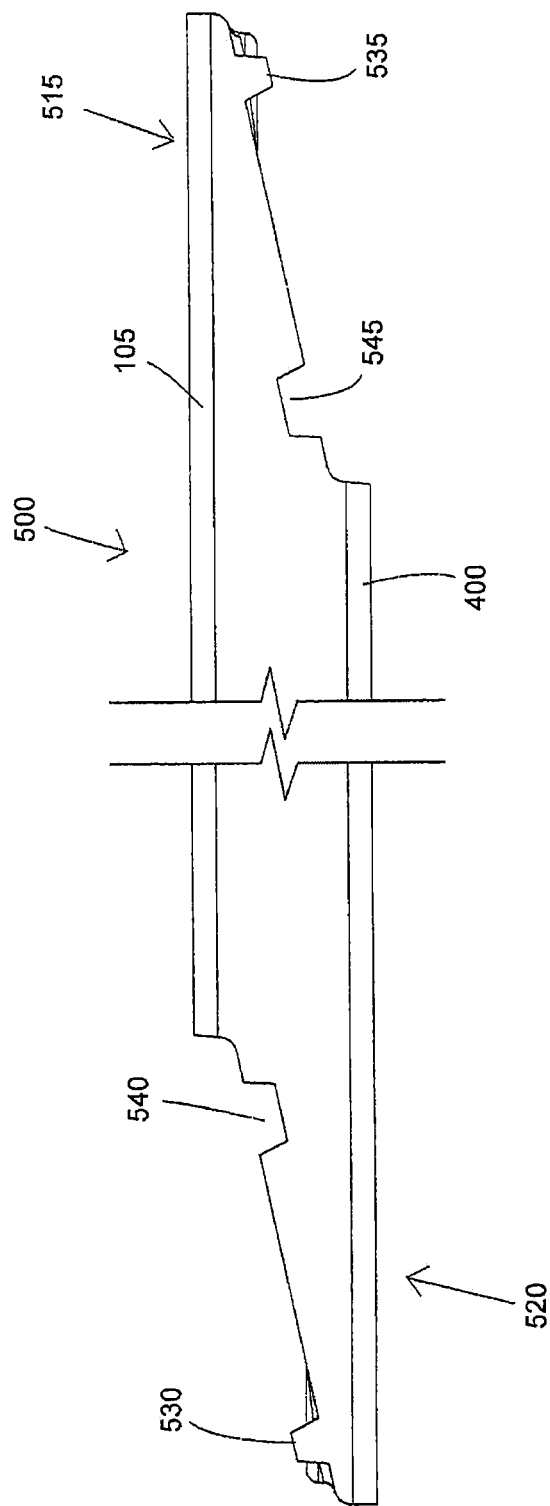

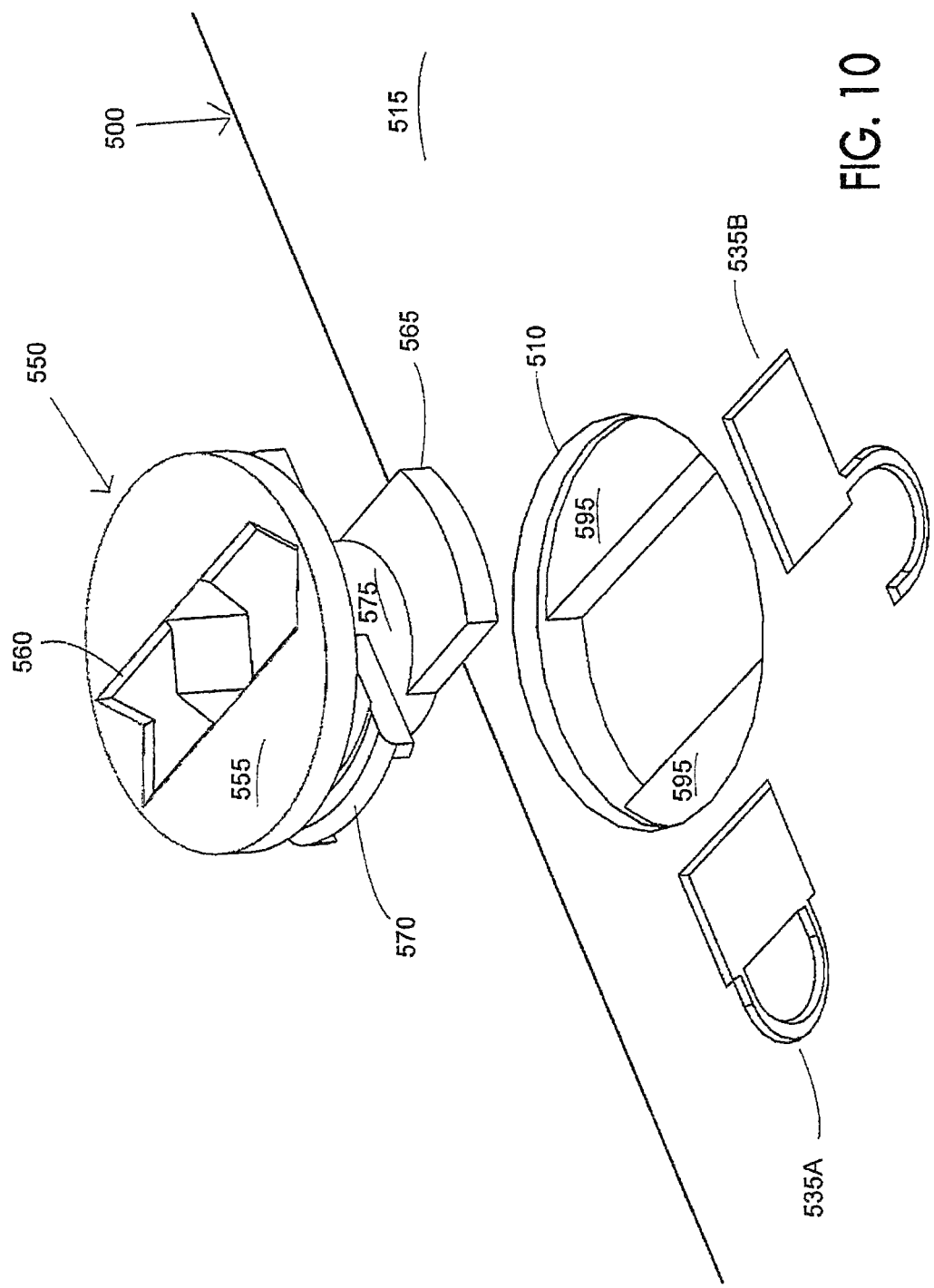

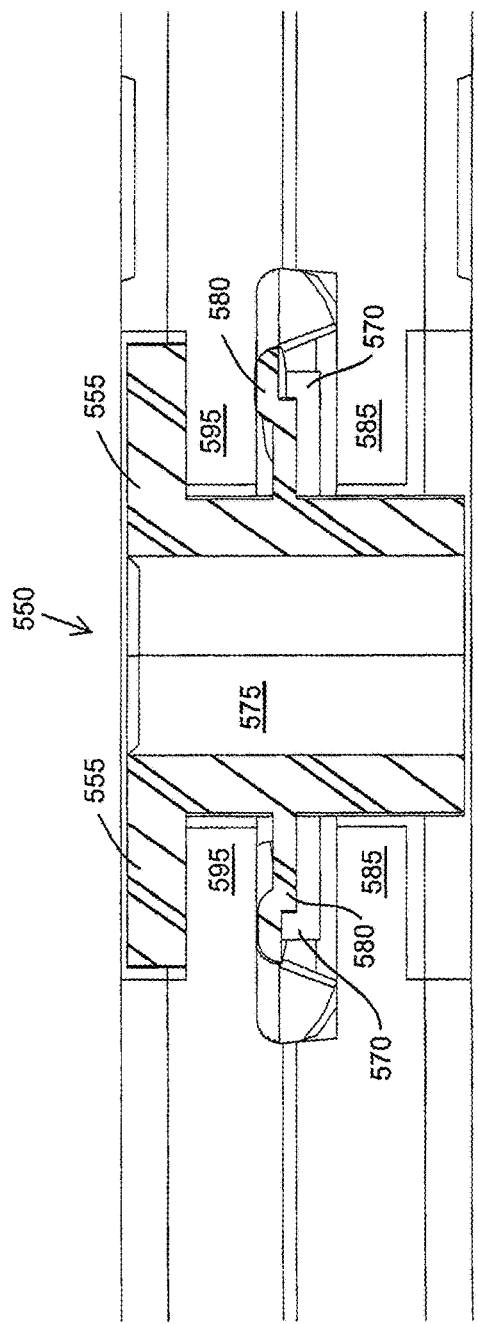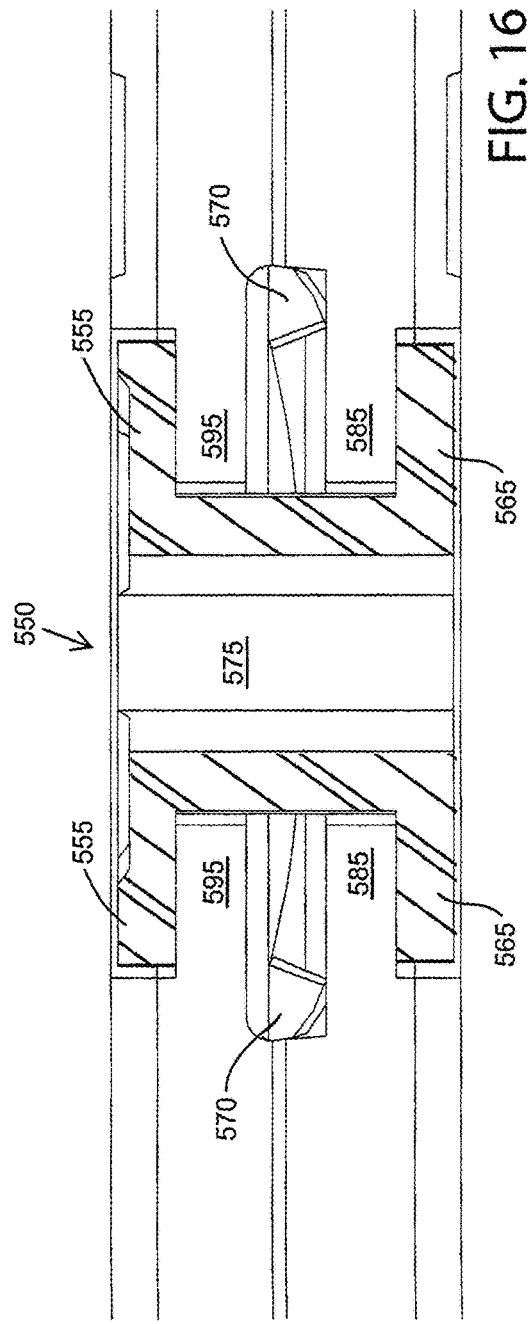

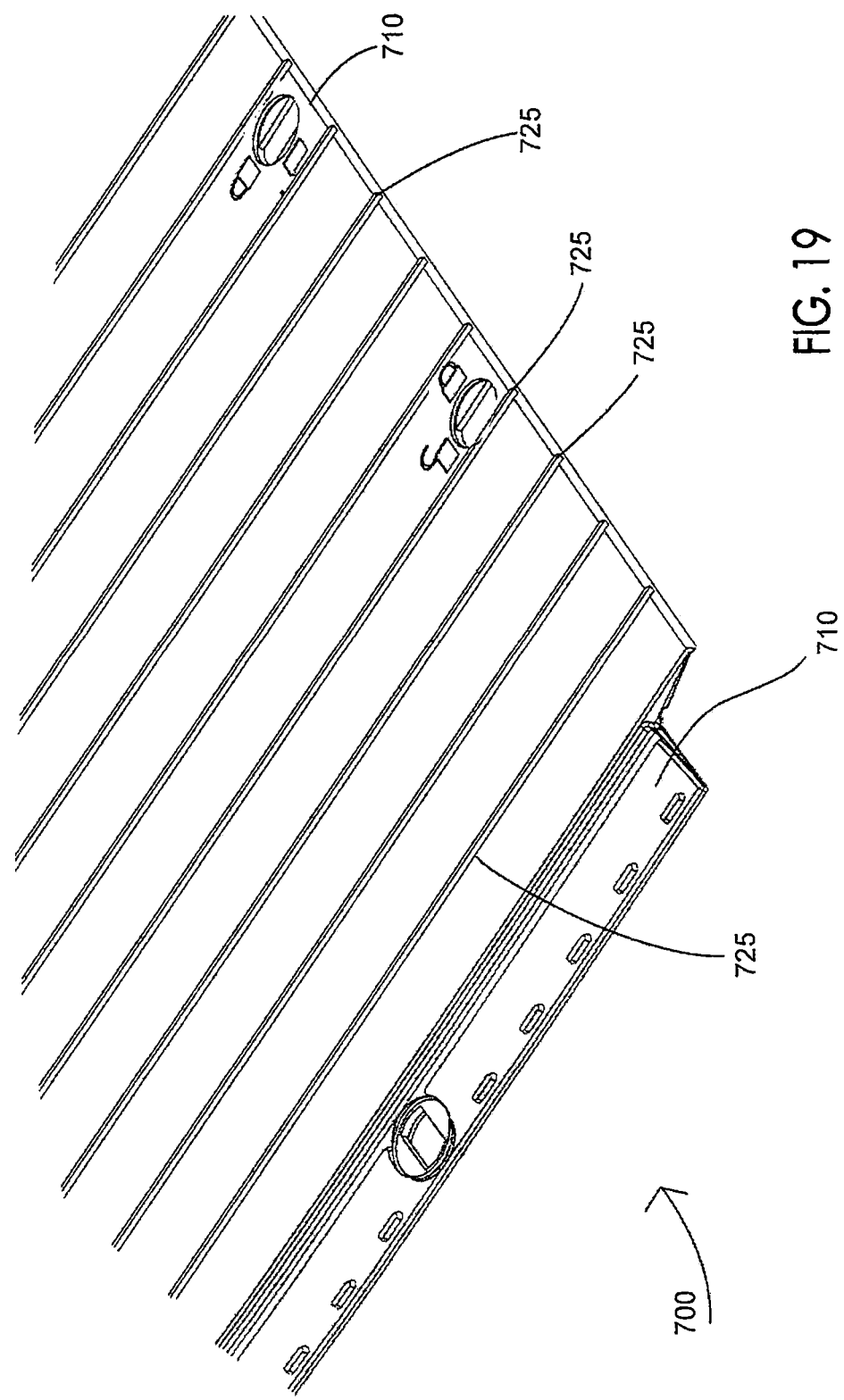

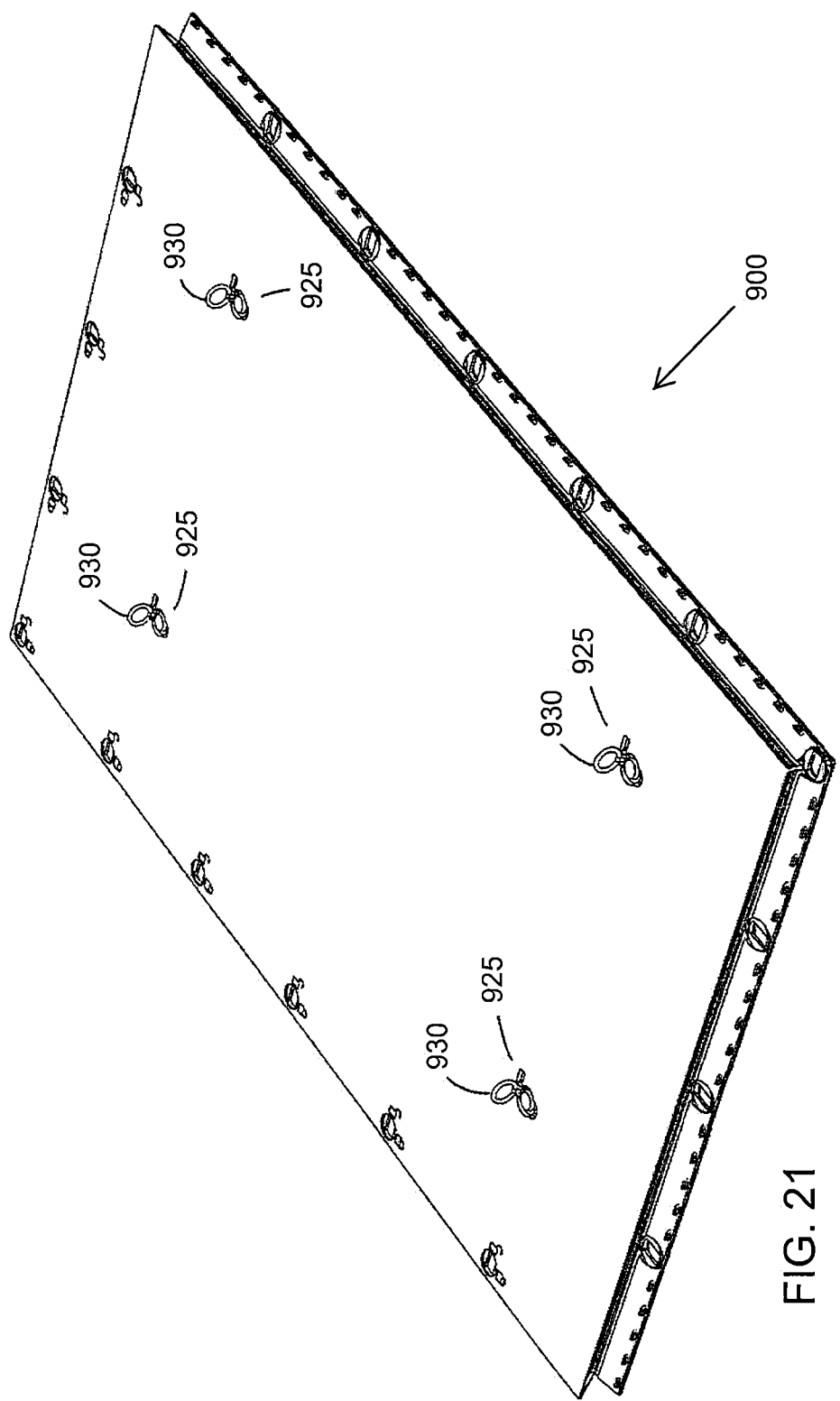

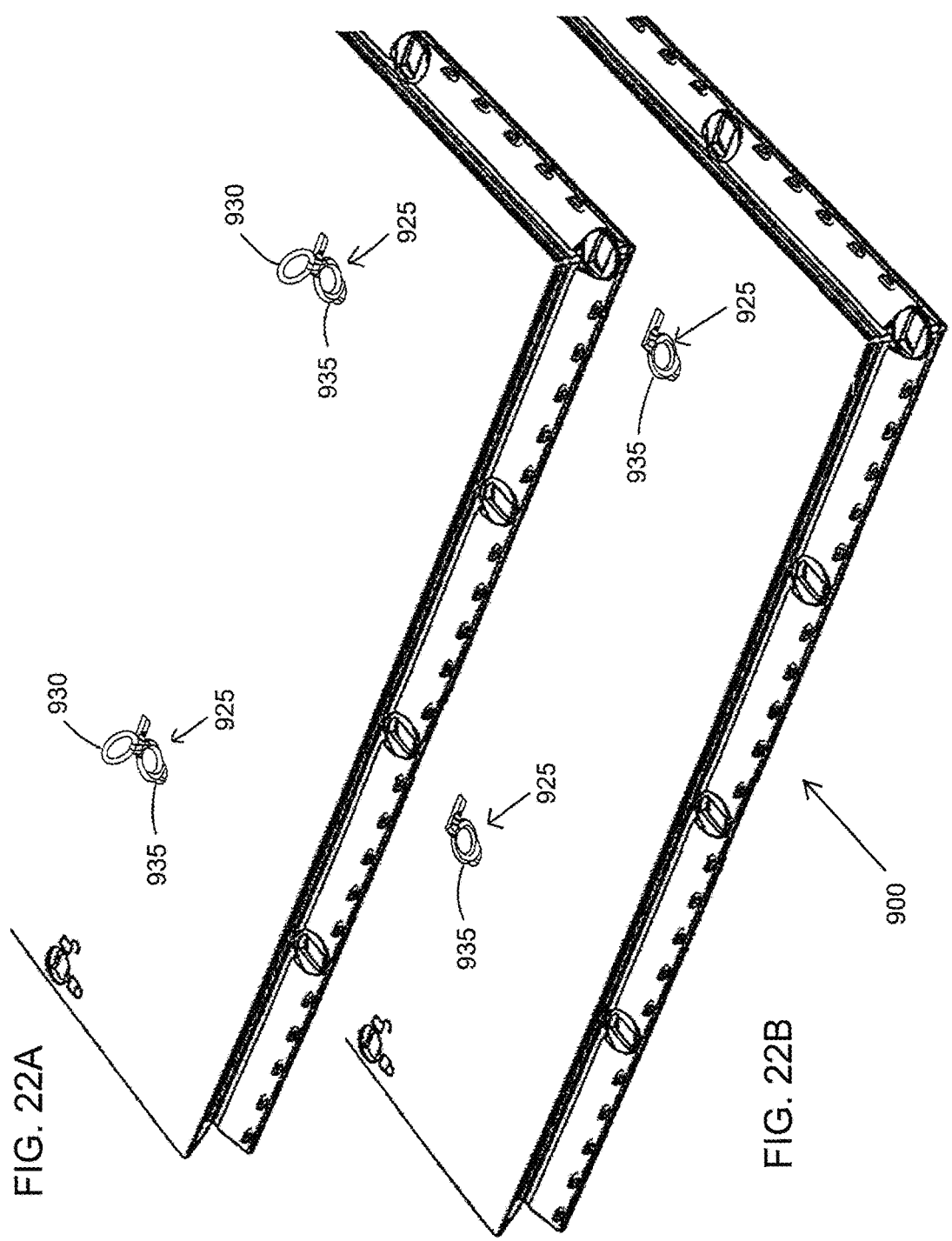

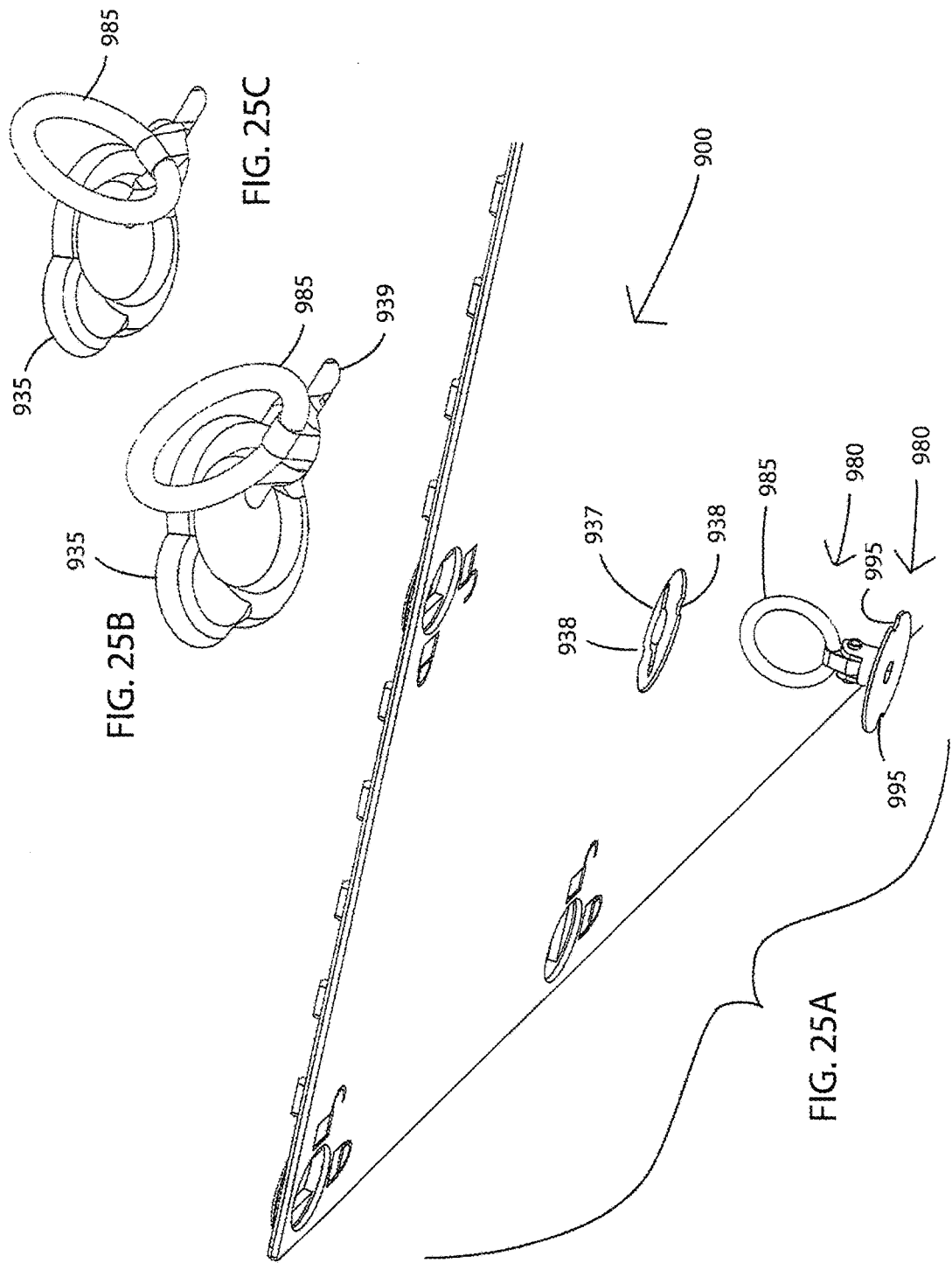

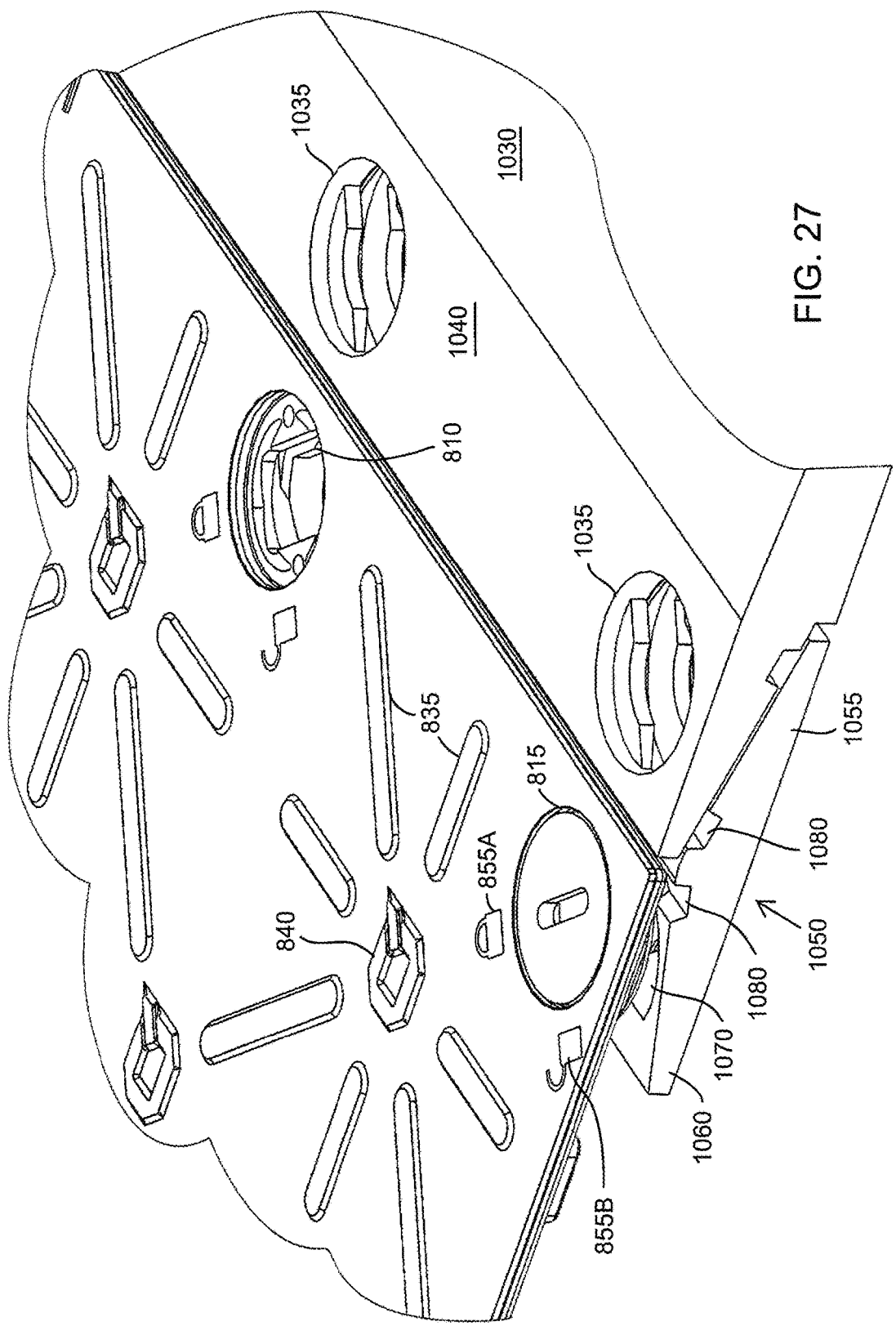

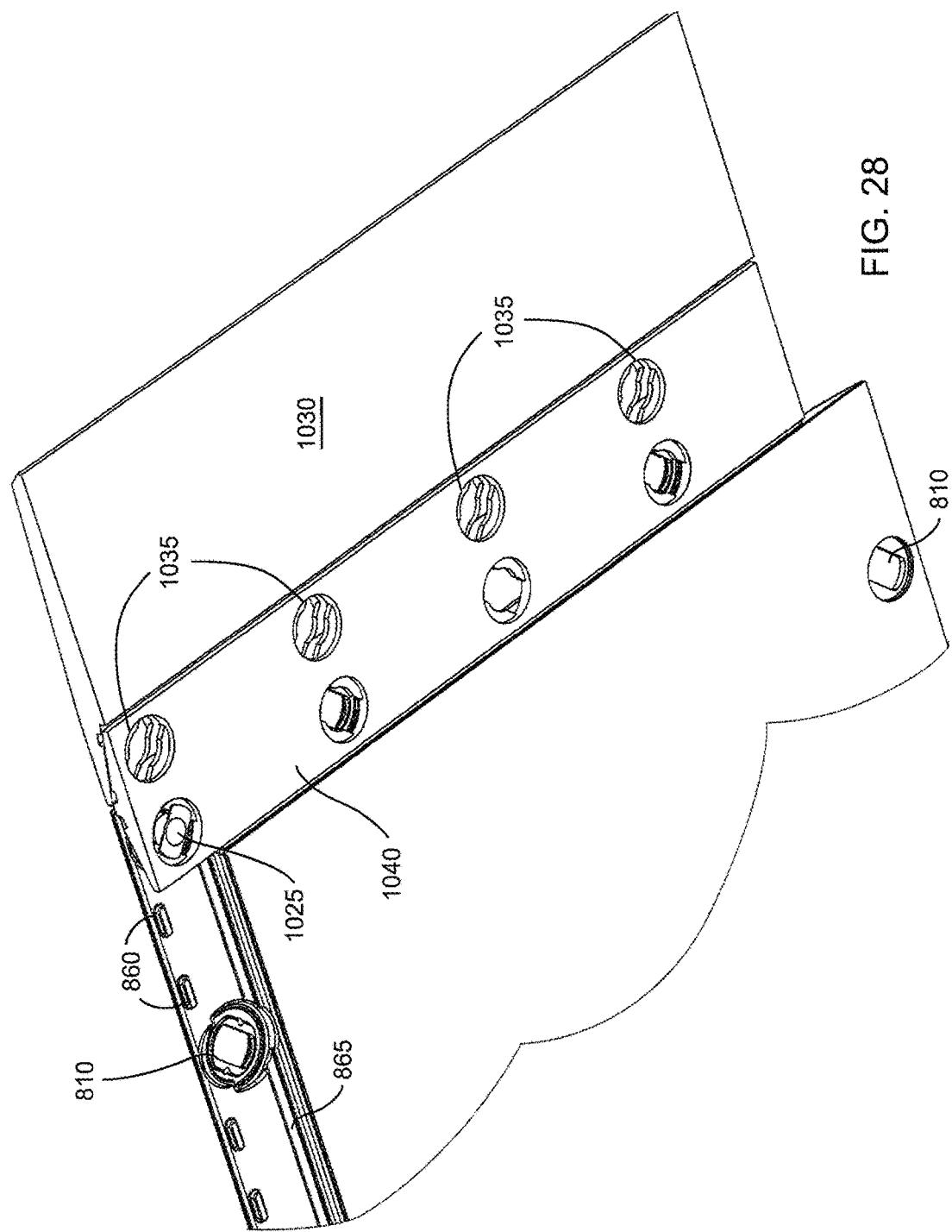

PANEL MATS CONNECTABLE WITH INTERLOCKING AND PINNING ELEMENTS

CROSS-REFERENCE TO RELATED APPLICATIONS

This application claims the benefit of U.S. application No. 62/368,954 filed Jul. 29, 2016, 62/402,391 filed Sep. 30, 2016, and 62/402,404 filed Sep. 30, 2016, the entire content of each of which is expressly incorporated herein by reference thereto.

BACKGROUND

The present invention relates to a reusable lightweight panel mat system for the construction of equipment support surfaces and temporary walkways and roadways in areas having poor ground integrity characteristics. More particularly, the present invention relates to a reusable system of durable panel mats which are much lighter than wood or wood/steel mats which can be quickly and easily positioned in a single layer to form equipment support surfaces, walkways or roadways and which can thereafter be easily removed and stored until needed again.

While conventional wood mats provide useful service at a reasonable cost, the wood core can deteriorate over time due to moisture causing gradual rotting and degradation of the wood material. This causes the mat to be discarded, because unlike some of the other materials that are used on the upper and lower layers of the mat, the core cannot be replaced without essentially making an entirely new mat.

Also, wood mats generally require heavy equipment for installation due their weight and bulk. Accordingly, alternatives to wood mats are needed for alternatives for wood mats that need to possess the necessary physical properties to be able to withstand harsh outdoor conditions as well as to support equipment. And of course cost is a factor in determining the selection of alternate materials, as it is not cost-effective to provide a mat that is multiple times more expensive than one that can be made of wood.

Thus, there is a need for improvement in these types of mat constructions both to provide longer service lives as well as to conserve natural resources and facilitate installation, and these needs are now satisfied by the panel mats of the present invention.

SUMMARY OF THE INVENTION

The invention now provides a lightweight universal panel mat made of plastic or elastomeric material and designed to be interlocked with additional panel mats of similar configurations. These panel mats have a first section having an upper surface that forms a top surface of the panel mat and is relatively flat, textured or structured to facilitate movement over the upper surface and a second section having geometry that includes a plurality of cells having a polygonal, circular or elliptical sidewall shape, with the cells having angled sidewalls and being open or with some or all of the cells having flat top surfaces, so that the geometry supports the first section and provides a plurality of open lower surfaces.

The first section of the mat can have a relatively flat lower surface for contacting the cell sidewalls or closed tops of some or all of the cells of the second section with the first and second sections molded together into a single component. This component can be used as a mat by itself or it can include a base of a third component, which typically is another plate.

The mats also include first, second, third and fourth sides forming a perimeter of the mat, wherein the first and second sides are adjacent and each includes an upper structure that has an upper surface that extends the top surface of the mat and a lower surface that slopes downwardly towards the bottom surface of the mat; and the third and fourth sides are adjacent and each includes a lower structure that has a lower surface that extends the bottom surface of the mat and an upper surface that slopes upwardly towards the top surface of the mat. The downwardly sloped lower surface of the upper structure and the upwardly sloped upper surface of the lower structure are preferably configured to allow for overlapping with respective lower and upper structures of other like mats when placed adjacent thereto for joining therewith by which the overlapped upper and lower structures form a generally flat continuous top and bottom surface of the overlapped mats.

The upper surface of the first section is generally rectangular of length L and width W where L and W each may be any value between 1 foot and 12 feet. Also, the first and second sections are welded or bonded together to form a unitary panel mat.

The upper and lower structures preferably include one or more alignment tabs and one or more tab receiving slots with the tab(s) provided in one of the upper or lower structures and with the slot(s) provided in the other of the upper or lower structures. Each upper and lower structure typically includes a plurality of spaced openings with the openings of the upper and lower structures configured to be in alignment when overlapping the respective lower and upper structures of other like mats using the alignment tabs and slots. These openings are configured to interlock on their own or to receive a fastening device therein when aligned to assist in more securely holding overlapped mats together.

Advantageously, in each upper and lower structure one opening is located in a corner of the mat between the adjacent first and second sides and another opening is located in a corner of the adjacent third and fourth sides. While any number of spaced openings can be provided depending upon the size of the mat, typically, five openings are provided on the upper structures and seven openings are provided on the lower structures to allow adjacent mats to be assembled by aligning at least some of the openings of the upper structure over the openings of the lower structure in full adjacent relation, or in a staggered configuration. The latter configuration enables the arrangement of adjacent mats in a ⅓, ½ or ⅔ extension overlap depending upon which two openings on the lower structure are overlaid with the corner opening and adjacent opening of the upper structure before receiving a fastening device therein in each overlaid pair of openings. This avoids the presence of a linear seam between rows of adjacently joined mats which adds to the stability of the installation.

The upper surface of the first section is preferably a structured surface that includes a raised pattern of spaced elements in a pattern, with the open lower surfaces of the cells of the second section providing a secure footing when the panel mat is placed on wet or muddy ground. Some or all of the cells have top surfaces that extend to and support the upper surface of the first section to strengthen that surface of the panel mat.

The panel mat also can include a third section located below and welded, molded, bonded, joined or sealed together to the second section, the third section configured and dimensioned to close off the openings of the cells and form a bottom surface for the panel mat that is relatively flat, textured or structured with the panel mat being able to withstand point loads of between 300 and 500 psi and spread loadings of 40,000 to 50,000 pounds per square foot. When the upper surface of the first section is relatively flat and the third section is a relatively flat plate, the bottom surface of the third section will also be relatively flat. This type construction is more suited for installations on a flat surface such as a concrete or asphalt pad or a wooden floor in e.g., a gymnasium. And to strengthen the mat to resist higher loading, metal wire, bar or plate reinforcement can be provided, with the reinforcement located within the second section or between the first and third sections.

In one configuration, the upper surface of the first section is a structured surface that includes a raised pattern of spaced elements in a pattern, such as a herringbone or spaced longitudinal line pattern, or one that includes indicia. For outdoor use, the top surface of the first section, the bottom surface of the third section, or both surfaces preferably include channels that assist in allowing drainage of water from that surface of the mat, with the channels molded therein or formed between a plurality of raised islands, elongated bumps or protrusions, raised indicia, other surface features, or combinations thereof.

For any of the embodiments described herein, a preferred embodiment of the invention provides a third section located below and welded, molded, bonded, joined or sealed together to the second section, with the third section configured and dimensioned to close off the openings of the cells and form a bottom surface for the panel mat that is relatively flat, textured or structured. This further strengthens the mat without adding significant weight as it allows the cells to provide better resiliency and compression properties to the panel mat with the panel mat being able to withstand point loads of between 300 and 500 psi and spread loadings of 40,000 to 50,000 pounds per square foot.

It is also possible for the upper surface of the first section to relatively flat and when the third section is a relatively flat plate, the bottom surface of the third section is also relatively flat. This type of construction is ideal for placement of the panel mats for temporarily protecting gym flooring or athletic fields from events such as graduations, concerts, of other large gatherings. It is also very helpful to evenly distribute any loads on the mats and prevents any edges of the open cells from cutting into soft surfaces such as grass or filling up with mud or dirt.

The top surface of the first section, the bottom surface of the third section, or both surfaces can include channels that assist in allowing drainage of water from that surface of the mat, with the channels molded therein or formed between a plurality of raised islands, elongated bumps or protrusions, raised indicia, other surface features, or combinations thereof. The upper surface of the first section may be a structured surface that includes a plurality of raised islands spaced by and closely arranged, with the islands having a polygonal, circular, or elliptical shape; and wherein the cells of the second section have top surfaces that are configured in the same shape as the islands and extend to and within the islands to support the upper surface of the first section to strengthen the panel mat.

Alternatively, when the top surface of the first section is structured, the bottom surface of the third section can be structured in a similar fashion to provide better engagement with the ground or to allow the mats to be used with either side facing upwards and away from the ground.

Regarding sizes, the mat is typically rectangular wherein W=2L or square wherein W=L, and wherein L is preferably 2.5, 3, 3.5, 4, 4.5, 5, 6, 7, or 8 feet and W is preferably 2.5, 3, 3.5, 4, 4.5, 5, 6, 7, 8, 9, 10, 12, 14 or 16.

The panel mats of the invention may also include one, two, three or four lifting elements that are affixed to the mats to allow lifting and installation or reclamation. These lifting elements include (a) a ring or U or D shaped member that is movable between first and second positions, wherein the first position is one where the member resides below the surface of the mat and the second position is an operative position where the ring or U- or D-shaped member is exposed for engagement with lifting equipment, and (b) a structure that secures the ring or U- or D-shaped member to the mat. Preferably, the structure that secures the ring or U- or D-shaped member to the mat includes a plate that engages the surface of the mat opposite the surface from which the member extends, and a post that extends through the mat for engagement with the ring or U- or D-shaped member either directly or through a connecting element.

Thus, the mats of the present invention can be assembled to easily provide a temporary support surface, deck, walkway or roadway using a plurality of connected panel mats as disclosed herein. Generally, this is accomplished by overlapping with respective lower and upper structures of other like mats when placed adjacent thereto for joining therewith by which the overlapped upper and lower structures form generally flat and continuous top and bottom surfaces of the overlapped mats.

Also, the openings of the upper and lower structures are preferably configured to be in alignment when overlapping the respective lower and upper structures of other like mats to assist in more securely holding the overlapped mats together. Furthermore, for even more secure connections, the openings are configured to interlock or to receive a fastening device of a cam, pin, stake, bolt, clamp, screw, clip, or peg which is configured to be received in aligned openings of the mats, side ramps and adapters. In particular, a preferred fastening device is a cam that includes a first locking tab that when rotated engages an adjacent mat to interlock the mats together. The cam can also include a second tab member that facilitates connection of the cam to the mat opening so that it cannot be dislodged as the mat is moved. The mats can be provided with indicia to indicate when the can is in a locked or unlocked position.

The installation of the panel mats can proceed by a number of ways depending upon what is desired. For a smaller installation, smaller size mats that are easily lifted and installed by one or two workers are preferable, while the larger size mats facilitate a faster construction because more area is covered by each mat. The lifting elements assist in allowing these larger mats to be lifted and installed or reclaimed by equipment. And often, combinations of the different mats would be utilized so that the temporary flooring best covers the entire space to be protected by the mats.

Advantageously, each upper and lower structure of the mats further includes spaced openings with the openings of the upper and lower structures configured to be in alignment when overlapping the respective lower and upper structures of adjacent mats; and wherein the openings are configured to interlock or to receive a fastening device therein to assist in more securely holding overlapped mats together, and wherein in each upper and lower structure one opening is located in a corner of the mat between the adjacent first and second sides and another opening is located in a corner of the adjacent third and fourth sides. The openings are configured to interlock or to receive a fastening device.

Preferably, five openings are provided on the upper structures and seven openings are provided on the lower structures to allow adjacent mats to be assembled by aligning at least some of the openings of the upper structure over the openings of the lower structure in full adjacent relation, or in a staggered configuration wherein adjacent mats are arranged in a ⅓, ½ or ⅔ extension overlap depending upon which two openings on the lower structure are overlaid with the corner opening and adjacent opening of the upper structure before receiving a fastening device therein in each overlaid pair of openings.

The fastening device is a cam, pin, stake, bolt, clamp, screw, clip, or peg which is configured to be received in the aligned openings of the upper and lower structures and which lock those structures together. Preferably, the fastening device is a cam that includes a first locking tab that when rotated engages an opening in an adjacent mat to interlock the mats together, and wherein the upper surface of each mat includes indicia adjacent each opening to indicate whether the cam is in a locked or unlocked position.

The mats or combined mat installation can further comprise one or more side ramps that facilitate smooth access to the upper surface of a mat by wheelchairs or other wheeled articles; and a separate adapter for each ramp wherein each adapter is connected to both the mat and the side ramp, wherein the ramps have sloped bottom surfaces that align with the upwardly sloped upper surface of the lower structure and the adapter has an upper surface with two sloped portions, one that aligns with the downwardly sloped lower surface of the upper structure of the mats and the other that aligns with the sloped bottom surfaces of the ramps. The side ramps and adapters form additional embodiments of the invention.

The side ramp is usable with any mat that includes an upper surface that forms a top surface of the mat and a lower structure that extends from at least one side of the mat, with the lower structure sloping downwardly from the side of the mat to the extended end of the lower structure and including one or more openings therein. The side ramp preferably comprises upper and lower surfaces wherein the lower surface is configured with a downward slope that corresponds to the downward slope of the lower structure of the mat; and one or more openings therein that correspond and align with the one or more openings of the mat. Similar to the openings that allow interlocking of mats, the openings of the side ramps are configured to interlock with openings of the mat or to receive a fastening device therein to so the side ramp can be connected to the mat.

The side ramps can also include one or more alignment tabs and one or more tab receiving slots with the tab(s) provided in one of the downward sloped surface of the side ramp or the downward slope of the lower structure of the mat and with the slot(s) are provided in the other of the downward sloped surface of the side ramp or the downward slope of the lower structure of the mat. Most preferably, the upper surface of the side ramp is configured to have a slope of 1/12 to meet American Disability Act requirements, with the length of the ramp determined based on that slope and mat thickness. For example, for a 3" thick mat, the length of the ramp would be 36 inches.

The adapter comprises an elongated member having first and second sides and an upper surface that has first and second upwardly sloping portions extending respectively from the first and second sides of the elongated member to form first and second sloped surfaces, wherein one sloped surface of the adapter conforms to the upwardly sloped upper surface of the mat and the other sloped surface of the adapter conforms to the lower sloped structure of the side ramp.

To interlock with the mat and side ramps, each sloped upper surface of the adapter further comprises one or more alignment tabs or one or more tab receiving slots, with the tab(s) provided either in the adapter sloped surface or one of the downward sloped surface of the side ramp or the downward slope of the lower structure of the mat, and with the slot(s) are provided in the other of the adapter or one of the downward sloped surface of the side ramp or the downward slope of the lower structure of the mat. Preferably, the mat and side ramp each have a plurality of spaced openings and the adapter has a plurality of spaced openings that are configured to be correspond to and be in alignment with the openings of the side ramp or mat so that the adapter and side ramp or mat can either interlock or receive a fastening device therein with the fastening device comprising a cam, pin, stake, bolt, clamp, screw, clip, or peg.

Thus, a preferred combination according to the invention comprises one or more mats as defined herein, with one or a plurality of side ramps and if necessary a respective adapter, as disclosed herein. The side ramps can be directly interlocked with the lower structures of the mats, while each adapter is connected to an upper structure of the mat and a side ramp. This allows access to the upper surface of the mat from any side that includes the side ramp and if necessary the adapter.

BRIEF DESCRIPTION OF THE DRAWING FIGURES

The invention is more fully appreciated upon a review of the appended drawing figures which illustrate the most preferred embodiments of the invention and wherein:

FIG. 1 is a perspective view of a panel mat according to a first embodiment of the present invention showing the top surface of the first section;

FIG. 2 is a perspective view of the mat of FIG. 1 showing a lower surface of the third section;

FIG. 3 is an exploded view of the mat of FIG. 1;

FIG. 4 is an exploded view of the mat of FIG. 2;

FIG. 5 is an illustration of the mat of FIG. 1 wherein the third section is not yet welded to the first and second sections;

FIG. 6 is an illustration of the mat of FIG. 2 wherein the third section is not yet welded to the first and second sections;

FIG. 7 is a perspective view of a panel mat according to a second embodiment of the present invention showing the top surface of the first section;

FIG. 8 is a perspective view of the mat of FIG. 7 showing a lower surface of the third section;

FIG. 9 is a side view of the mat of FIG. 7 showing the upper and lower structures that are configured to facilitate joining or connection to a like configured mat;

FIG. 10 is a perspective view of a fastening element in the form of a cam which has not yet been inserted into an opening of the mat;

FIGS. 15 and 16 are side cross-sectional views of the cam fastening element of FIG. 10 in the adjacent mats in unlocked and locked positions respectively;

FIG. 19 illustrates the bottom surface of a mat that has linear channels provided therein;

FIG. 21 illustrates a mat having four lifting elements;

FIGS. 22A and 22B illustrate the mat of FIG. 21 with the lifting elements in an operative position in FIG. 22A and in a retracted position in FIG. 22B;

FIGS. 25A, 25B and 25C illustrates an alternative construction for a lifting element wherein FIG. 25A illustrates how the lifting element is inserted into the mat, while FIG. 25B illustrates the ring of the lifting element in an operative position and FIG. 25C illustrates the ring pivoted for placement in the retracted position in the mat;

FIG. 27 is a detailed side view of a portion of one mat, adapter and side ramp from the installation shown in FIGS. 26A and 26B; and FIG. 28 is bottom view of the mat, connector and side ramp of FIG. 27.

DETAILED DESCRIPTION OF THE INVENTION

Figure 11:
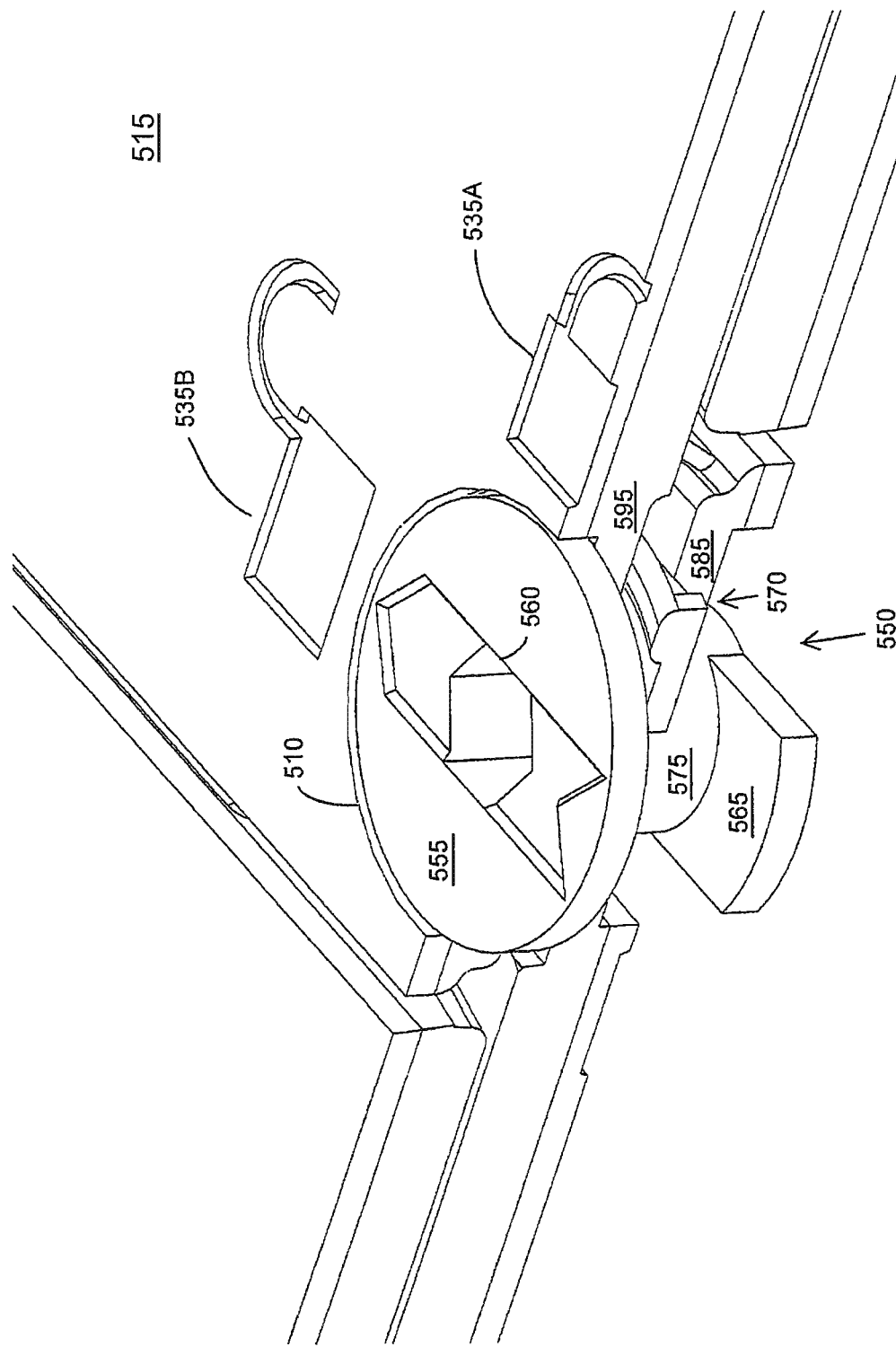
FIG. 11 is a cross-sectional view of two mats that are to be joined together by the cam of FIG. 10 wherein the cam is in the unlocked position.

Certain terms that are used herein are defined hereinbelow to assist in the understanding of the invention.

The terms "substantially" and "relatively" are used for their ordinary meanings to indicate that the dimensions or configurations are not precise or exact. A skilled artisan can readily determine what tolerances are acceptable to provide a surface that is considered to be flat based upon the size of the panel mats and the type of service that the panel mats are expected to provide. Typically, the terms "substantially" or "relatively" will mean that a surface can vary by as much as an inch or two although in the more preferred embodiments the variance is less than 1 inch.

Additionally, all dimensions recited herein are approximate and can vary by as much as ±10% to in some case ±25%. In some situations, the term "about" is used to indicate this tolerance. And when the term "about" is used before reciting a range, it is understood that the term is applicable to each recited value in the range. Often, the craftsmanship and engineering procedures that are followed in construction of these mats minimize these tolerances as much as possible or industrially practical.

The invention relates to a rectangular panel mat that is preferably square and that is made of plastic or elastomeric material. The panel mat can be made of first and second sections (for two layer mats) or with an additional third section (for three layer mats) which are part of an integral component that is molded to have the desired configuration and features. Typically, the first and second sections are molded together in one operation while the third section is later joined to the mat formed from the first and second sections. Alternatively, a two layer mat can be made from a solid integral plastic or elastomeric component wherein the tabular extensions, openings and slots or recesses are milled or routered into the component top provide the configurations and features. The third section can then be added to the formed mat. Preferably, however, the first and second sections are separately molded and then combined in the desired configurations disclosed herein. To form the panel, the molded first and second sections may be are joined together by welding, an adhesive, molding, bonding, or by joining via an interlocking structure. Having each section heated and joined together in a press is another and more preferred joining option.

A typical panel mat has a 42" square configuration as this facilitates molding of the first and second sections and results in a lightweight panel mat that can be easily installed manually. The sections are typically molded to a thickness of between about ⅟₁₆" to ⅛" depending upon the plastic or elastomeric material that is used to make the panel. The panels can range in size from 1'×1' to 16'×16'. They can be square of any size at or it within those values and of any particular feet, inches or inch fractions. Alternatively, the panels can be rectangular, e.g., 1'×2', 2'×6', 3'×8', 4'×8', 4'×10', 6'×9', 6'×12', 8'×12', 8'×16" and even 12'×16'. The 42 inch square panel would have a weight of approximately 40 pounds when molded from upper and lower halves of high density polyethylene each having a skin thickness of 0.2 inches. The preferred panels have sizes of 2.5'×2.5', 3'×3', 3.5'×3.5' or 4'×4' as these are relatively easy to be moved because they would have a weight of about 100 pounds or less so that they can be lifted and installed by manual labor rather than heavy equipment. The larger size panels are heavier but the temporary flooring can be installed more quickly given the greater area that these mats cover.

Also, rectangular mats can be used wherein the length dimension is double the size of the width dimension. Thus, along the length of one mat, two additional similarly configured mats would be joined thereto whereas the width dimension would be joined to half of the length of an adjacent mat. And if desired, combinations of square and rectangular mats can be joined together to form any particular shape decking or temporary roadway or walkway. As an example, a 42 inch square panel mat can also be joined to a rectangular panel mat that is 42"×7' long. And if desired, rectangular or square mats can be made. The only limitation is the way that these mats are shipped with widths up to about 8 feet being preferred so that the mats can be shipped by conventional tractor trailers.

The larger size square or rectangular mats that weight more than 100 pounds are provided with lifting elements as disclosed herein. And while the lifting elements are very useful and possibly necessary when provided on the larger, heavier mats, they also are useful when applied to any size mats. For example, this would allow multiple smaller mats to be lifted together by such elements to expedite loading of the mats onto a truck or even for installation or reclamation of such mats in connection with the forming or breakdown of the temporary flooring.

As noted, the overall size (length, width) should be maximized for loading the panel mats into standard ISO containers and more importantly for concise packing into trucks, tractor trailers or rail cars for shipping. Also the thickness of the panel mats should be between about 1 and 3" and typically between 1.5" to 1.75" thick. The mats are constructed to withstand repeated traffic from shop forklifts carrying loads, semi-truck and trailer travel, and stage point loads all while being rigid enough to protect the surface from damage and prevent any rutting of the subgrade. Point loads of between 300 and 500 psi are provided as point loadings while spread loadings of 40,000 to 50,000 pounds per square foot are provided. The highest loadings are achieved with the three section constructions described herein and with the densest array of geometrical cells therein. Particularly preferred materials for these panel mats are HDPE or Polypropylene. The panel mat should not have any external fasteners as the tabs and openings, slots or recesses are incorporated into the mat structure itself to facilitate interlocking during installation.

When a third section is desired to seal off the cells, it can be provided in the form of a plate or solid flat structure that is bonded, adhered, welded or otherwise joined to the other sections. It also can provide a relatively flat bottom surface for the panel mat when desired, such as when the panel mats are to be installed on a flat surface such as a floor.

The panel mats can be molded of many different materials, including any conventional polymeric or copolymeric thermoplastic materials, thermosetting materials, or even fiberboard materials made of recycled plastic or polymeric materials from used carpets, plastic packaging and the like. Mixtures or combined blends of plastic materials may also be used. The panels may also be made of elastomeric materials which can be thermosets (requiring vulcanization) or thermoplastic.

A wide range of thermoplastic or polymeric materials can be used for the sections of the panel mats of this invention. These materials would be molded or cast to the desired size and thickness of the mat. Useful materials include:

- Acrylonitrile butadiene styrene (ABS)
- Acrylic (PMA)
- Celluloid
- Cellulose acetate
- Cyclo olefin Copolymer (COC)
- Ethylene-Vinyl Acetate (EVA)
- Ethylene vinyl alcohol (EVOH)
- Fluoroplastics (PTFE, alongside with FEP, PFA, CTFE, ECTFE, ETFE)
- Ionomers
- Kydex, a trademarked acrylic/PVC alloy
- Liquid Crystal Polymer (LCP)
- Polyacetal (POM or Acetal)
- Polyacrylates (Acrylic)
- Polyacrylonitrile (PAN or Acrylonitrile)
- Polyamide (PA or Nylon)
- Polyamide-imide (PAI)
- Polyaryletherketone (PAEK or Ketone)
- Polybutadiene (PBD)
- Polybutylene (PB)
- Polybutylene terephthalate (PBT)
- Polycaprolactone (PCI)
- Polychlorotrifluoroethylene (PCTFE)
- Polyethylene terephthalate (PET)
- Polycyclohexylene dimethylene terephthalate (PC (PC) T)
- Polycarbonate
- Polyhydroxyalkanoates (PHAs)
- Polyketone (PK)
- Polyethylene (PE)
- Polyetheretherketone (PEEK)
- Polyetherketoneketone (PEKK)
- Polyetherimide (PEI)
- Polyethersulfone (PES)—see Polysulfone
- Polyethylenechlorinates (PEC)
- Polyimide (PI)
- Polylactic acid (PLA)
- Polymethylpentene (PMP)
- Polyphenylene oxide (PPO)
- Polyphenylene sulfide (PPS)
- Polyphthalamide (PPA)
- Polypropylene (PP)
- Polystyrene (PS)
- Polysulfone (PSU)
- Polytrimethylene terephthalate (PTT)
- Polyurethane (PU)
- Polysulfone (PSU)
- Polytrimethylene terephthalate (PTT)
- Polyvinyl chloride (PVC)
- Polyvinylidene chloride (PVDC)
- Styrene-acrylonitrile (SAN)

It is also possible to utilize fiberboard as the elongated members or sheets that form the core structure. The fiberboard material is made of recycled plastic or polymeric materials from used carpets, plastic packaging, rice hulls and the like. They can be provided in the desired sizes for use as the core structure of the mats of this invention. They can be combined with other plastic materials as is generally known. In addition to being environmentally resistant due to their plastic content, these fiberboard/recycled materials are environmentally friendly by allowing recycling of used plastics or polymeric materials.

The top and bottom sections may also be made of an elastomeric material. The elastomers are usually thermosets (requiring vulcanization) but may also be thermoplastic. Typical elastomers include:

Unsaturated rubbers that can be cured by sulfur vulcanization—these are preferred from a strength and hardness standpoint:
- Natural polyisoprene: cis-1,4-polyisoprene natural rubber and trans-1,4 polyisoprene gutta-percha;
- Synthetic polyisoprene;
- Polybutadiene;
- Chloroprene rubber, i.e., polychloroprene;
- Butyl rubber (i.e., copolymer of isobutylene and isoprene) including halogenated butyl rubbers (chloro butyl rubber; bromo butyl rubber);
- Styrene-butadiene Rubber (copolymer of styrene and butadiene); and
- Nitrile rubber (copolymer of butadiene and acrylonitrile).

Saturated (i.e., non-vulcanizable) rubbers include:
- Ethylene propylene rubber (EPM);
- Ethylene propylene diene rubber (EPDM);
- Epichlorohydrin rubber;
- Polyacrylic rubber;
- Silicone rubber;
- Fluorosilicone Rubber;
- Fluoroelastomers;
- Perfluoroelastomers;
- Polyether block amides; and
- Chlorosulfonated polyethylene.

The elastomeric, thermoplastic or thermosetting materials disclosed herein can also be provided with conventional fillers to increase weight and hardness. They also can be reinforced with particulates, fibers such as glass, fabric or metal screening or scrim to reduce elongation and provide greater rigidity.

Regarding the configuration of the panels, the sections are separately molded with peripheral boundaries that are configured to match each other. The first and second sections can be blow-molded or compression molded to the desired sizes. Then, the sections are joined together where the boundaries are in contact by welding, adhesives, heating, or interlocking connections or combinations thereof. It is desirable for the sections to be joined together to form a waterproof structure so that any openings existing between the sections do not fill up with dirt or water during use. Typically, the first and second sections are sealed by welding or adhesives at a peripheral seam. To facilitate an adhesive or weld the joint, the peripheral boundaries can be provided with a minimum flange detailed to provide additional surface area for sealing. The third section can then be joined to the other two to form a three ply mat. As noted, the third section provides additional compression and strength to the panel mat by holding the cells in position where they cannot move laterally.

The first section can be configured with an appropriate top surface that may be relatively flat, textured or structured to facilitate movement over the panel mat. While a completely smooth top surface may be used, it is preferred that the top surface at least include some texture or channels that facilitate the drainage of moisture and provide a more secure footing for movement across the panels. The channels can be formed by texturing or spaced raised islands or other structures that are provided in the top surface. The top surface can also include raised or embossed patterns or designs that indicate the supplier or owner of the mats. When a flat or relatively flat surface is provided for the top surface, grit or particles can be included to assist in providing better traction when the surface becomes wet. The panels are configured to be oriented with the top section being the surface which is traversed by personal or equipment while the lower portion of the second section faces the ground.

The bottom surface of the panel mats may also configured with a flat, textured or structured surface. Preferably, the bottom surface is textured, structured or is provided with openings so that the panel mat can be securely placed on wet or muddy ground. For the latter feature, the bottom surface can be provided with closed holes that are of essentially the same configuration as the islands of the top section and that are sufficient tall to extend to the islands to provide further support to the upper surface of the top section. If desired, the holes can be configured as wells or cups that have the same configuration as the islands so that the top surfaces of the holes or cups fit into the islands. This provides reinforcement of the upper surface to movement or articles that contact that surface. If desired, the holes and islands can be joined together by welding, adhesives, bonding, heating or by snap-locking.

Alternatively, the first and second sections can be molded together as a single component. For this the top section is a plate or sheet that has a flat bottom surface so that it forms the upper portion and tops of the cells while the second section includes the cell sidewalls. The result is that the cells are closed at the top by the first section and the cell sidewalls provide the strength reinforcement of the top section. The first and second sections can be molded together to form the single component. The same result can be obtained by welding or adhering a top section plate that has a flat bottom to the upper ends of the cells of the second section.

The third section can be provided as a flat plate if desired so that the bottom surface of the panel mat is relatively flat. Of course, the third section can also be provided with cells or can be in the form of a grating or other structure that has openings, channels or indentations. As the second section provides some of this, the third section is typically used to provide a flat bottom surface and to hold the cells of the second section in position between the first and third sections. And in some embodiments, the bottom surface can also include a textured surface or a raised or embossed patterns or designs that indicate the supplier or owner of the mats so that it appears the same as to top surface of the mat or to provide better gripping or more secure placement on the ground. Generally, the ground is prepared to be relatively flat to receive the bottom surfaces of the panel mats, but the panel mats can also be placed on a previously prepared flat cement or asphalt surface to provide temporary protection of such surfaces. Typically, however, the panel mats are placed on earth, grass, or similar terrain to provide better footing and support for personnel or light equipment traffic. The textured or structure bottom surface facilitate a more secure placement on gravel or wet or muddy ground.

One advantageous structure for the upper surface of the first section is one that includes raised circular or polygonal islands, or combinations thereof, with the islands spaced and arranged closely together near each other. This forms channels between and around the islands that are typically between 0.25 and 1 inch wide. When polygonal islands are used, the spacing can be somewhat uniform but it also can be random. The islands can be oriented along a horizontal or vertical direction if desired. The only restrictions would be that the islands not be too high (more than 1 inch tall) or spaced too far apart (more than 2 inches) so that a person's foot can get caught or twisted between the islands. A preferred hexagonal structure is illustrated in the drawings, but other structures that include squares, rectangles, triangles, octagons, pentagons or other shapes including circles or ovals can be used. A surface texture that mimics spaced boards or tire thread designs are also suitable.

An advantageous structure for the lower surface of the second section can be described as a honeycomb or open cell structure. The term "honeycomb structure" refers to a structure that has openings or open cells therein which extend to the bottom surface of the bottom section. The shape of the cells can be hexagonal, square, rectangular, or of another polygonal shape, or they can even be round or oval provided that the top surfaces or configurations of the cells match the configuration and arrangement of the islands of the top section. Some or all of the cells have a top surface which extend up to and into the islands through the lower surface of the top section. As noted, the top surfaces of these cells are joined to the lower surfaces of the islands by a press fit, snap-locking, adhesives or spot welding. The flat tops of the cells can also support a flat lower surface of the top section. With this construction, the strength of the panel can be further increased as each cell acts as a separate support for the upper surface of the top section.

Typically, the honeycomb pattern of geometrical cells includes those that have a top surface having a perimeter of 3 to 12 inches. This includes round top surfaces of about 1" to about 4" diameter and square or rectangular trapezoids having side of about 1" to about 4". As noted, the tops of the cells can be open or some or all of them can be closed. The same is true of the bottoms of the cells, which again can be open or where some or all of the cells terminate in closed flat surfaces. Similar perimeters would be provided for other shapes (i.e., oval, pentagonal, hexagonal, octagonal, etc.). For greater compressive strengths, more dense (i.e., smaller size) cells may be provided. A skilled artisan can design the cell configuration for any particular compressive strength requirements based on the overall size of the mat and number of sections that are to be included.

The sidewalls of the cells are also configured to impart strength to the mat. These are typically provided at an angles with regard to the top or bottom surfaces of the mat rather than being perpendicular. Angles of between 45 and 75 degrees are preferred with 60 to 65 degrees being optimal.

The cells can be spaced apart or can be placed with at least part of their sidewalls in contact. The number of cells and their spacing and arrangement can vary but a skilled artisan can easily determine any optimum arrangements based on the anticipated loading that will be applied to the mats. It is also possible to have some, typically half, of the cells face upward and others, again typically half, facing downward. This allows half of the cells to include flat surfaces facing the first section and half of the cells to have flat bottom surfaces facing the third section. The flat surfaces can be placed within recesses in the top and/or bottom plates or the can support a flat surface of the top and/or bottom plates that face the cells. Of course, other arrangements are possible including from 10% to all of the cells having flat top surfaces, as well as from 10% to all of the cells having flat bottom surfaces. The half and half arrangement provides better support for the upper and lower surfaces of the mat when the first and third sections are provided as plates.

The panel mats are carefully designed so that they can interlock with adjacent, similarly sized and configured panel mats to form a temporary surface or substrate upon which people or light equipment can be placed thereon or moved across much like the a building floor. This interlocking is achieved by the unique design of the sides of the mat. As noted, the first and second sides each include an upper structure that has an upper surface that extends the top surface of the mat and a lower surface that slopes downwardly towards the bottom surface of the mat, while the third and fourth sides each include a lower structure that has a lower surface that extends the bottom surface of the mat and an upper surface that slopes upwardly towards the top surface of the mat. The downwardly sloped lower surface of the upper structure and the upwardly sloped upper surface of the lower structure are configured to allow for overlapping with respective lower and upper structures of other like mats when placed adjacent thereto for joining therewith by which the overlapped upper and lower structures form a generally flat continuous top and bottom surface of the overlapped mats.

The upper and lower structures of the mats also include a plurality of openings. The openings of the upper structures are provided with a lower portion that protrudes below the sloping side while the openings of the lower structures are configured to be slightly wider and recessed then the protruding portions of the upper structures. Alternatively, the upper structures can be provided with downwardly facing protrusions while the lower structures can be provided with recesses that receive the protrusions. These configurations allow the protruding portions of the upper structures to be received within the openings of the lower structures so that a secure connection can be made. In some embodiments, the components are configured to provide snap blocking of the upper layer into the lower layer. This can be done by providing a narrower rim around the upper edge of the lower opening or recess. Alternatively, the openings can be designed to receive a fastening or pinning member, such as a cam, which can be inserted and rotated to lock the upper structures to the lower structures. This provides the most secure connection between the mats that is the least resistant to separate or move apart when in use. Details of these configurations are described herein in connection with the appended drawings.

These panels are designed for quick and easy installation by one or two workers. To do this, a first mat is installed in a particular position with the lower structures exposed in the direction for addition of further mats. Thereafter, the upper structures of the additional mats are placed above the lower structures of the previously placed mat to connect the subsequent mats to the initially placed one. These operations are repeated until the entire temporary floor structure is completed. And the ends of the initially placed mats that have upper structures which are not in contact with lower structures of adjacent mats, a separate board or configured component can be placed beneath those sections for support to prevent breaking of upper structures. Alternatively, a certain number of the mats that are to be installed can be provided with only the lower structures on two sides and with opposite sides that are have the thickness of the entire mat. Similarly, on the last mats to be installed, the lower structure would not be receiving the upper structure of an additional mat. Again, a separate component can be added onto the lower structure to form the remaining upper surface of the mat, or certain mats can be provided only with upper structures on two sides and with the other two sides configured to have the thickness of the entire mat.

The openings are aligned so that they can easily be connected together, either by the upper protrusion engaging the opening of the lower opening, with or without snap-locking, and without requiring a large amount of force to connect the structures together during installation or to disengage them when removing the installation. Alternatively, the holes can be configured to receive a fastening component that can be quickly placed therein and turned to lock the edges together.

The configuration of these mats as well as the various sizes that can be used, facilitates a relatively quick and efficient installation of a temporary flooring system. The smaller mats are easily lifted and installed by one or more workers without the use of any connecting hardware. The mats are designed such that each subsequent mat can be laid upon an installed mat with the sloping members in contact.

The openings can be configured so that those on the side of one mat can be received by or placed upon those on the corresponding side of another mat with the alignment tabs and slots assisting in the proper placement of one mat next to another. And when a very secure flooring is needed, the cams or other pinning elements can be used to connect the openings of those sides of the mats together in a locked position.

The configuration of the openings are designed and made either with cutouts or with a shorter or smaller dimension that does not extend to the full width of the mat such that the tabular members can be easily placed therein without binding. In addition when larger panel mats are in use, the lifting elements allows those mats to be simply and easily transported into position. In fact, the flooring installation proceeds in a manner such that after the initial panels are in place, the equipment that is lifting the mats can then move over the previously installed mats such that the field or gymnasium surface is not damaged by the installation equipment.

Turning now to the drawings, FIG. 1 shows a square panel mat 100 that has a relatively flat upper surface 105 that has three openings 110 located on the periphery of two adjacent sides of the mat. These openings are actually provided on the upper structures 115 described previously that have a downward sloping bottom surface.

The opposite sides of the mat have the lower structures 120 that includes openings 125 and an upward sloping surface that is configured and dimension to conform precisely to the downward sloped surface of the upper structure.

And while these structures can have uniform descending or ascending flat surfaces, they are preferably made with different configurations such as undulations, or other irregular surfaces with the only requirement being that the upper structure and lower structure fit together to form a uniform thickness which is the same as that of the rest of the mat.

FIG. 2 illustrates the same mat 100 but viewed from its back side such that the same element numbers are utilized. FIG. 2 also shows a bottom plate 130 that is used to provide a smooth bottom to the mat when desired.

FIG. 3 more clearly shows that the panel mat 100 of FIG. 1 is initially molded in two sections, a first top section 200 and a second bottom section 300. The first section 200 includes the upper structures 115 and the second section 300 includes the lower structures 120. These sections are molded together to form an upper component for the mat. Alternatively, this upper component can be formed of a single molded sheet or plate and the appropriate configuration and structure can be provided by milling of the sheet or plate.

A most preferred joining technique for the first and second sections is to prepare them in a twin-sheeting operation. This operation, which is also known as twin sheet forming, combines the process disciplines of compression molding, blow molding, and vacuum forming to mold, laminate, and trim multiple layers of materials (substrates with cover stock) in a one step process. The twin sheet molding process forms two sheets of plastic simultaneously through the use of a separate mold on the top platen and a separate mold on the bottom platen. Once the plastic sheets have been vacuum formed, they remain in their respective molds. While both sheets still remain at their forming temperature, the two molds are brought together under high pressures and the two sheets are bonded together. The result is a single product with hollow areas requiring no secondary bonding operations.

Also illustrated in FIG. 3 are the cells 135 of the second section. These cells 135 are shown as trapezoidal pyramids having a flat top surface and four angled sides. The flat top surface contacts the lower surface of top section 105 providing numerous spaced sport supporting surfaces beneath top surface 105. And while these cells 135 are shown as pyramids, they also can be configured to be circular, oval, or polygonal in circumference with either straight sides or angled sides as shown. And in an alternate embodiment where the top surface 105 of the first section 200 is provided with a structured surface, such as raised circles ovals or polygons, the cells can be configured with the upper surfaces of the same shape as the raised structure so that the upper surfaces of the cells can fit in indentations on the lower surface of section 105. This also allows the first and second sections 200, 300 to join together when subjected to heat and pressure. Additionally, the upper surfaces of the cells can be configured with the recesses in the bottom surface of the first section 200 so that a snap locking fit can be achieved.

For the second section, a number of different structures can be used to provide support for the upper surface and the first section. In one embodiment, a grid or grating structure can be used where the cells are defined by the openings of the structure, with the cell walls forming polygons or being round or oval in shape with the walls preferably oriented perpendicular to the first section flat bottom surface. Alternatively, the walls can be oriented at an angle to the first section flat bottom surface, with that angle measuring between 45 and 90 degrees and preferably between 60 and 70° with respect to the first section flat bottom surface. The perpendicular orientation provides the greatest compressive strength to the mat while the angled walls provide other benefits with regard to greater cell openings on the bottom sides of the cells and easier manufacture especially to facilitate removal from the mold that forms the cells. It is also contemplated that some or all of the cells could be closed or have flat top surfaces that would contact and support the first section flat bottom surface that is positioned on top of the cells.

The cell structure also provides a plurality of open bottom ends of the cells that face away from the first section. Having these cells remain open facilitates installation of the mats on grass surfaces wherein the entire grass surface is not contacted by the mat but only by the perimeters of the open cells. This minimizes damage to the grass during use of the mats. Additionally, the mats can be made of transparent or translucent plastic material so that sunlight can pass through the mats and contact the grass. This facilitates grass growth and health to again reduce damage from coverage by the mats.

In some cases, it is desirable for some or all of the bottoms of the cells to have a closed bottom surface. This is desired know when the third section plate is to be included in the mat structure as the closed bottom surfaces of the cells supports the third section plate. A good compromise of open and close cells would be 50:50 for both the top and bottom portions of the second section.

The sidewalls of the cells are also configured to impart strength to the mat. These are typically provided at an angles with regard to the top or bottom surfaces of the mat rather than being perpendicular. Angles of between 45 and 90 degrees are preferred with 60 to 89 degrees being optimal. It is desirable to provide a draft angle for the sidewalls of the cells as noted above. In this regard, the top portions of the cells would be smaller than the openings on the bottom of the cells. This structure which is referred to above as angled sidewalls prevents bending and twisting and of the mat when subjected to load bearing forces. And while an angle of 90 degrees is preferred from a strength standpoint, when the second section is molded, that angle can provide difficulty in removing the second section from the mold. Thus, a slightly lesser angle should be used to provide a draft angle that assists in removal of the molded second section from the mold. This can be in the range of 85 to 89 degrees. As noted herein, other angles of as low as 60 or even 45 degrees can be used if desired for any particular mat configuration or temporary surface installation.

FIG. 3 illustrates the angled sidewalls of the cells that provide additional strength to support the upper surface of the first section as well as to provide compression resistance to the mat. While it is possible to instead use 90 degree cell wall angles, as noted these are harder to mold into the second section and are not preferred for that reason. Instead, an angled sidewall, one that is fully or at least partially angled with respect to the upper and lower mat surfaces, provides greater rebound to the mat after the applied forces are removed. It also allows the cells to slightly compress but as each cell is adjacent another cell, the expansion is limited by the expansion of the adjacent cells. This provides good compression resistance to the mat. And a noted herein, the use of the bottom third section joined to the second section provides additional support for the cells and even more compression strength to the mat.

The aligned holes 110, 125 are also illustrated. These can be configured as described herein where the holes on the first section 200 can include a lower protrusion that fits within the opening 110 of the second section 300. Alternatively, the second section 300 can have a raised periphery around the opening which fits into a recess in the bottom of the opening 125 of the first section 200. The main feature of these holes are that they are in alignment to allow interlocking and connection of one mat to an adjacent, similarly configured mat.

Additionally, a third section 400 in the form of a flat plate is later added to the support component if desired when the flat bottom surface 130 is desired for the mat. FIGS. 3 and 4 also illustrate how the openings are not hindered by the addition of third section 400. Openings are provided in third section 400 either in the form of circular cut outs 140 or by removing a corner 145 of the plate. The third section 400 does not extend below upper structure 115 so that it does not interfere with the openings of the upper structure 115 of the mat. And as explained herein, third section 400 is an optional component which can be added to form a flat bottom surface 130 for the mat.

The third section preferably is used to provide a flat bottom surface for the panel mat. It is possible for the third section to be configures so that it also extends beneath the tabular members to further reinforce those members and help them resist damage during installation when the tabular members are inserted into the openings, slots or recesses, as well as to protect against damage from impact if the panel mats were to be dropped in a way where the tabular members would engage the ground first and bear the force of the weight of the mat. This is typically used on flat or graded surfaces, such as those provide by cement, asphalt or clay.

The first 200 and second 300 sections are joined together in a first operation either by compression molding or by heating and pressing the sections together. These sections also can be joined by suitable adhesives or by welding. Third section 400 can then be optionally added in a second operation where it is welded to the second section 300 of the joined first 200 and second 300 sections. The bottom surface 130 of the mat is selected based on the intended use of the mats.

FIG. 4 shows the bottom surface of the bottom section 300 of the panel mat 100 and the back sides 260 of the raised islands. As noted these cell openings provide better securement of the mat to the ground when the ground surface is wet or muddy. When the mat is to be used on a more uniform ground surface, such as a gym floor or paved parking lot, the third section 400 provides a bottom plate for the mat.

FIGS. 5 and 6 illustrate the first section 200 and second section 300 molded together as a single structure 250 prior to the addition of third section bottom plate 400. FIG. 6 illustrates the cell structure in a cross sectional view to show how each cell supports upper surface 105 of the top section. Such a configuration with multiple cells provides very good support for loads that are placed on upper surface 105 of the mat.

And while the cells are a preferred embodiment, it is also possible to configure the second section 300 with other structures that can support the first section 200 and upper surface 105 of the mat. Such other structures can include rod or bar members that are preferably rectangular and that are placed between and adhered to the first section 200 and second section 300 whether in the form of parallel spaced members or in the form of intersecting members that form a grid or grating-like structure that contacts the bottom of top surface 105 for support. The particular internal configuration between the first and second sections can be selected based on the anticipated weight and forces that the upper surface 105 of the mat will experience in use. And the formation of spacing between the bars or rods whether they are interconnected or not provide the equivalent of the cells of the current embodiment, with the top surfaces of the bars or rods providing the necessary support for the upper surface 105 of the mat.

FIGS. 7 and 8 illustrate a second embodiment of a panel mat 500 according to the invention. This embodiment utilizes a similar structure for the upper and lower sections and bottom plate but is provided to illustrate further embodiments for locking the mats together. Mat 500 includes upper surface 505 and upper structure 515 that extend outside the core of the mat. Also provided are lower structures 520 that extend outside of the core of the mat. Upper structure 515 includes three openings 510 as shown. These openings align with openings 525 of lower structure 520.

FIGS. 7 and 8 also show tab members 530 that are present on the upper surface of lower structure 520 and that are used for alignment of the mats when the mats are to be connected together as described herein. The openings on the upper surface of the mat also include indicia 535A, 535B which are used to indicate whether the mats are in a locked position 535A or in an unlocked position 535B when the mats are joined together using a fastening element of a particular cam element. Openings 510, 525 also are provide a clear path extending through both openings and mats to cover the situation where a stake or other ground engaging component is used to secure the first mat in a particular position upon installation.

FIGS. 7 and 8 also illustrate that the openings 510, 525 are configured with an elongated slot which can facilitate entry of a fastening cam that can be used to join two adjacent mats together. As described herein in FIGS. 9-14, the fastening cam includes elongated tabular members that can fit into the slot of the holes and then be rotated to engage an internal structure of the holes to lock the mats together.

FIG. 9 is a side view of the mat 500 to illustrate the sloped portions of the upper 515 and lower 520 structures that contact each other from adjacent mats upon installation. The center portion of the mat is removed from FIG. 9 for convenience in illustrating these sloped portions of the upper 515 and lower 520 structures. Also shown are top surface 105 of the first section 200 and third section 400 bottom plate. The upper and lower structures each include a sloped surface that is configured for mating engagement with the other when adjacent mats are connected. Lower structure 520 includes tab members 530 as also shown in FIG. 7 which are configured in a line at the lower portion of the sloped section. An upper portion of the sloped surface includes an elongated slot 540. Similarly the lower surface of the upper structure 515 is also sloped and includes tab members 535 at an upper portion of the slope and elongated slot 545 at a lower portion of the slope. Tab members 535 of the upper structure are configured to fit into slot 540 of the lower structure 520 when an adjacent mat is to be connected. As the adjacent mat is lowered into position, tab members 530 of the lower structure 520 are received by slot 535 of the upper section thus allowing the upper structure 515 of one mat to be in contact with the lower structure 520 of the adjacent mat and form a uniformly thick surface for the joined mats. Tab members 530, 535 are utilized as they are more forgiving and allow lateral movement of the adjacent mat for installation with respect to the other mat, compared to the use of an elongated bar or rib member which fills in the slot and makes it is more difficult to adjust the position of the adjacent mat. In certain applications, however, a bar or rib rather than tab members would be sufficient and can be used as an alternate embodiment. Similarly, it is possible to use multiple separate openings that receive one or more of the tab members although this requires a more precise installation. Also, other arrangements of locating members where one is received in the other can be used instead of the tab members and slots or openings.

FIG. 10 illustrates fastening cam member 550 which is shown before it is placed into a mat opening 510. The cam 555 includes an upper disc shaped face 555 that includes an opening configured in the shape of an arrow 560. The lowermost portion of the cam 550 includes a locking tab 565 which extends from an internal post 575 and which is rotated to lock the mat to an adjacent mat through engagement of a shelf member in opening 525 of the lower structure 520 of the adjacent mat. Also, an intermediate locking tab 570 may be provided for certain fastening cams, and is a preferred embodiment when the fastening cam 550 is to be secured within opening 510 of the upper structure 515 of mat 500. As shown in FIG. 10, the openings 510 in mat upper structure 515 have various shelf members 585, 595 that are engaged by the tabs 565, 570 for locking of lower structure 520 of an adjacent mat to upper structure 515, and for retaining the fastening cam 550 in upper structure 515 prior to engagement of an adjacent mat.

FIG. 10 shows the locking and unlocking indicia 535A, 535B which are imprinted, embossed or otherwise provided on the upper surface of upper structure 515. FIG. 10 also illustrates the structure of the slot wherein upper shelf number 595 is provided to support disc 555 of cam member 550. Shelf member 595 is also engaged by tab number 570 while shelf member 585 is engaged by fastening tab 565 when the cam 555 is rotated to a locked position to interconnect adjacent mats together. Shelf members 585 and 595 are shown in further detail in FIGS. 15-16.

FIG. 11 illustrates the fastening cam 550 in position in opening 510 and in an unlocked position as shown by the arrow 560 pointing to the unlocked indicia 535B. Fastening cam 555 has been inserted into opening 510 with tab members 570 engaging shelf member 595 to secure the fastening cam 555 in opening 510. This not only places fastening cam 555 in position for engaging opening 525 of a lower structure 520 of an adjacent mat, but it also prevents fastening cam 555 from falling out of the opening 510 when mat 500 is being moved for transport or installation or reclamation.

Figure 12:
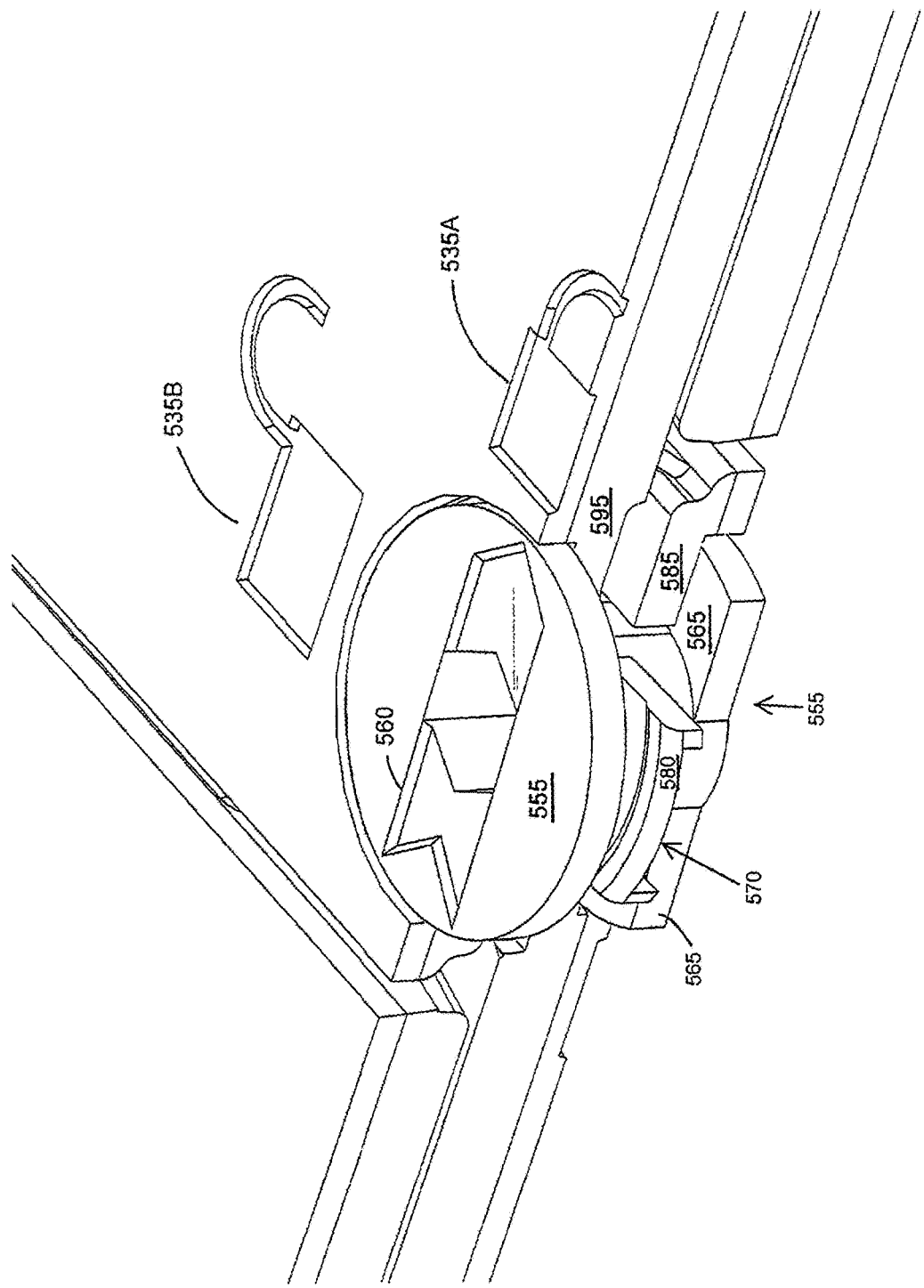
FIG. 12 is a cross-sectional view of two mats that are joined together by the cam of FIG. 10 wherein the cam is in the locked position.

FIG. 12 shows fastening cam 555 rotated 90° into a locking position so that lower locking tabs 565 can engage shelf member 585 in opening 525 of the lower structure 520 of an adjacent mat for interlocking therewith.

Figure 13:
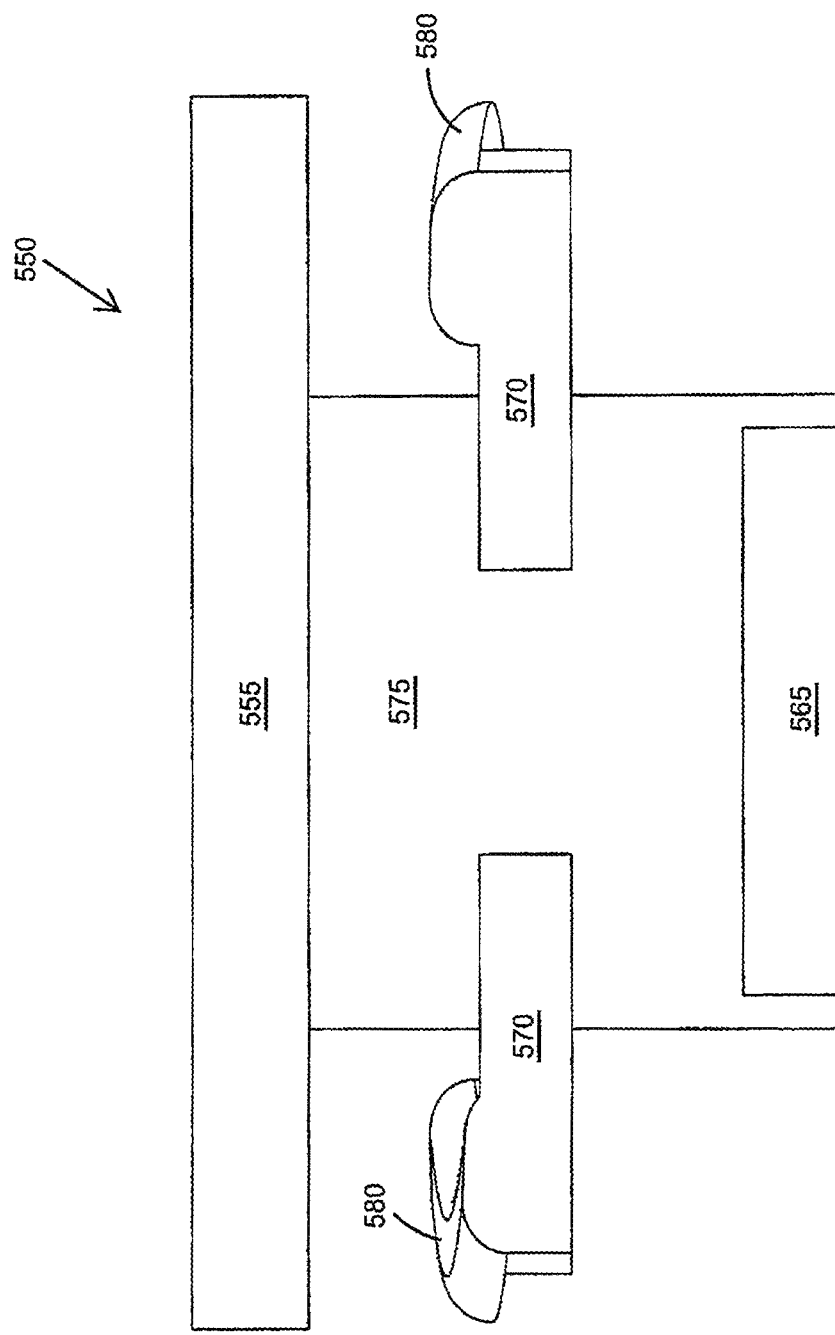
FIGS. 13 and 14 are side views of the cam fastening element of FIG. 10.
Figure 14:
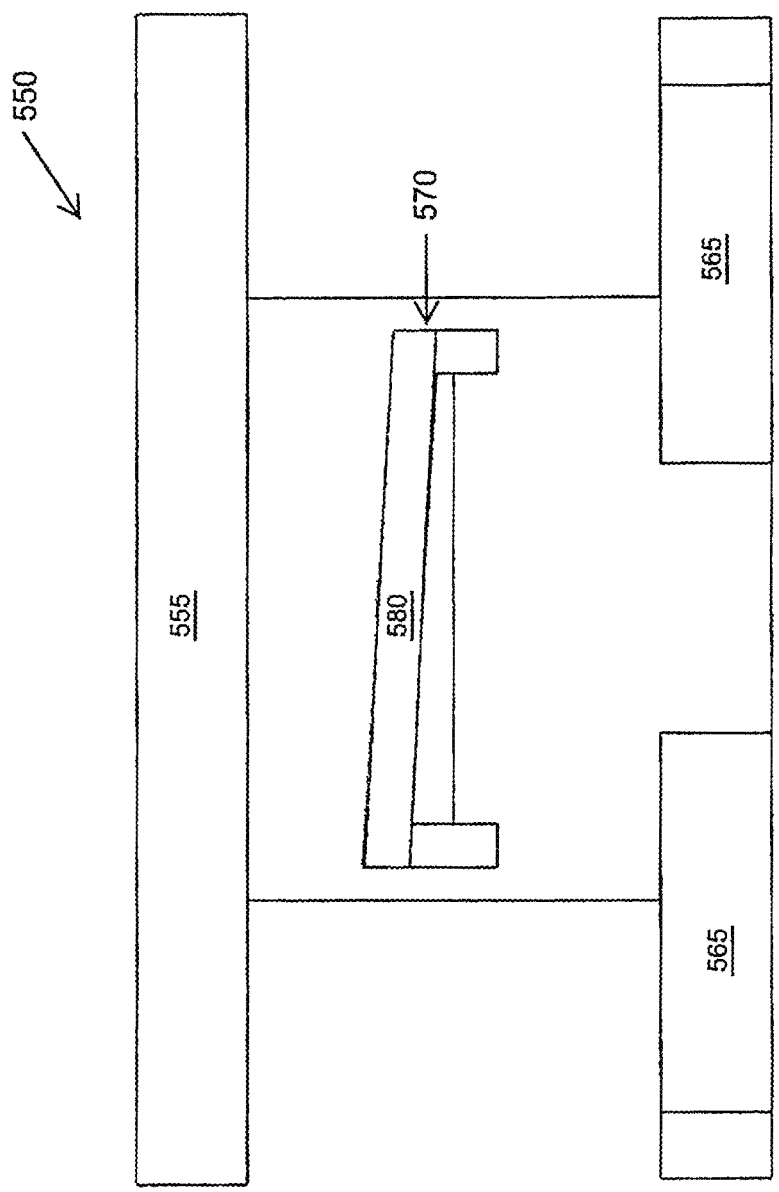

The specific configuration of the fastening cam 550 is best shown in FIGS. 13-16. FIGS. 13-14 are side views of the fastening cam 555 taken 90° apart. Fastening tab 565 is relatively flat and such that rotation of the cam 550 from the position shown in FIG. 13 to the position shown in FIG. 14 locks the opening 525 of lower structure 522 to opening 510 of upper structure 515 by engagement of locking tab 565 with lower shelf 585.

FIG. 14 illustrates that the intermediate tab number 570 is configured with a sloped portion 580 that gradually provides greater force on the upper shelf member 595 when cam 550 is to be secured to opening 510 of upper structure 515. This arrangement also loosens the cam 550 connection to the opening 510 to facilitate engagement of fastening tab 565 with lower shelf 585 of opening 525.

FIGS. 15-16 disclose the fastening cam 550 in unlocked and locked positions, respectively, in the openings of two adjacent mats 500A, 500B. The same number for the fastening cam 550 elements are used for these figures. The interlocking of sloped portion 580 of the intermediate tab number 570 on the upper shelf member 595 of upper opening 510 is shown in FIG. 15, while the interlocking of lower fastening tab 565 with lower shelf 585 of opening 525 is shown in FIG. 16.

Figure 17:
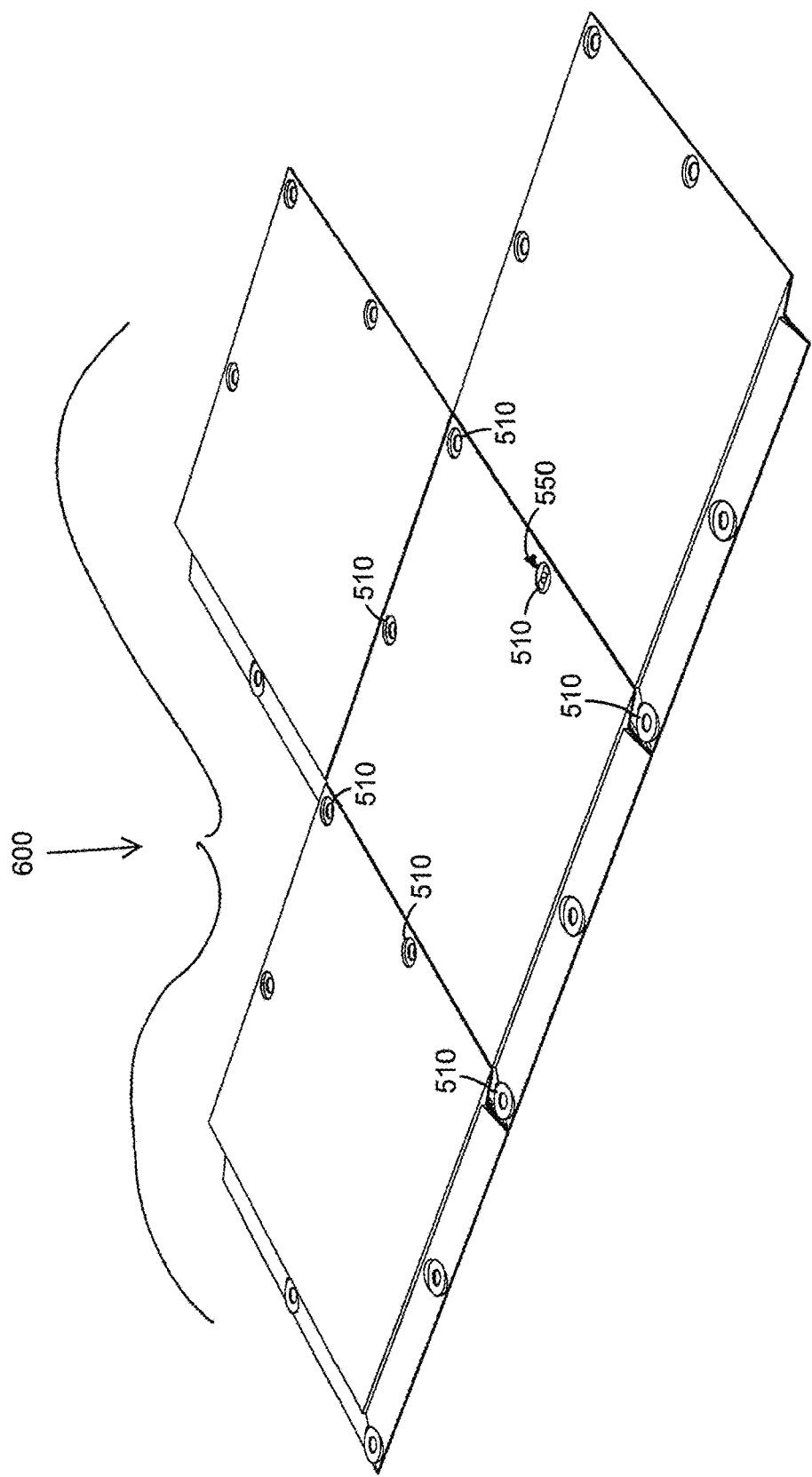
FIG. 17 is an illustration of four interconnected mats.

FIG. 17 illustrates a number of connected mats 600 that are joined together wherein one fastening cam 550 is illustrated. Each opening 510 that is positioned above an opening of an adjacent mat would be provided with a fastening cam 550 so that a sufficient interlocking arrangement is provided to avoid movement of one mat to another. The details of this cam and the interlocking connection is that which is previously described in FIGS. 15-16.

The mat 500 may have a flat upper surface 105 although it is possible to configure that surface with channels or other irregularities for water removal. For use indoors or in areas that are shielded from the elements (e.g., under a tent), a flat top surface is acceptable.

To provide a bottom flat surface 130 for the mat, third section 400 is provided as a separate flat plate. This plate 400 may be bonded to the lower side of the second section by welding, adhesives or by applying heat and pressure to the components in a mold. Third section 400 includes cut outs so that the openings of the upper and lower structures are not blocked.

As noted, although not necessarily preferred for certain embodiments, the panel mats can be formed of first and second sections that are obtained from a single piece of plastic or elastomeric material that is cut, drilled, milled or routered to the desired shape and configuration. For example, a solid sheet or molded plastic or rubber can be configured with the taps, slots, openings, and surface features described herein. While this is more expensive, the costs for setting up the machining equipment would be amortized across the large number of mats that would be produced with these features. This can be used to form the first and second sections of the mat while when a flat or closed bottom surface is desired, this would be achieved by the addition of a third section of a flat plate.

And as noted, the channels that are linear or random lines or grooves on the top and bottom surfaces of the panel mat allow water to drain from the top surface while also allowing the bottom surface of the mat to be more securely placed on wet or muddy ground. And the bottom surface may include openings as shown herein for the second to partially receive gravel or other prepared ground surfaces to again more securely anchor the panel mat in place. It also can be flat by the addition of a third section.

Figure 18:
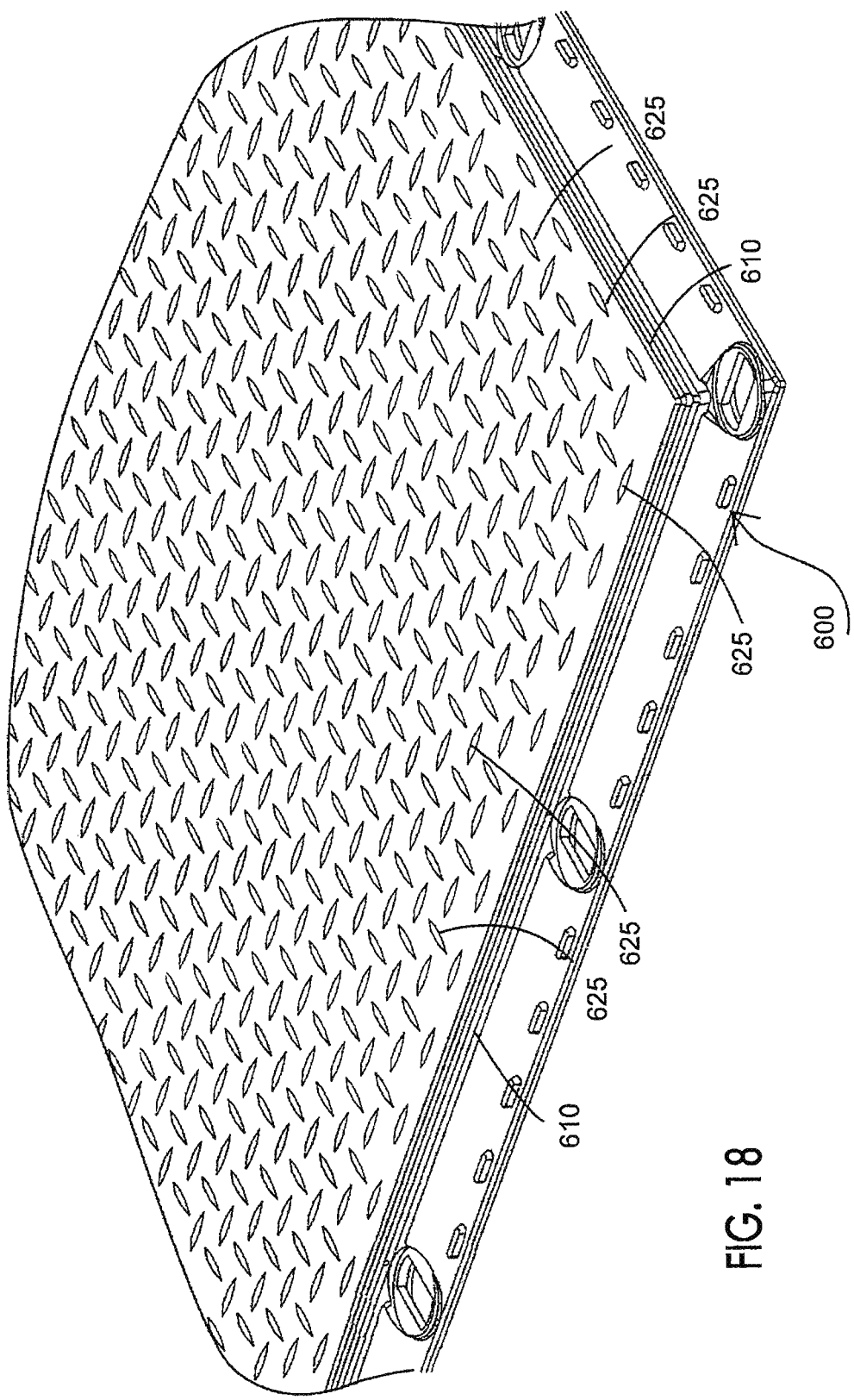
FIG. 18 illustrates a mat that has a structured upper surface in the form of a herringbone pattern.

FIGS. 18 and 19 illustrate mats that have alternative structured surfaces. FIG. 18 illustrates a mat 600 that includes an upper surface in the first section 610 with a herringbone pattern of raised elongated bumps 625. These bumps are molded into the upper surface of the top section 610 of the mat in order to provide resistance to slipping when operators or equipment move across the mat. The herringbone pattern and elongated bumps 625 provide sufficient open space between them to allow water to drain from the mat in particularly when a worker steps on the mat or a tire or other item moves across the mat when the mat is wet.

Alternatively, other designs can be used to provide a structured surface on the mat. FIG. 19 illustrates a mat 700 that has on the bottom of its third section 710 a plurality of linear channels 725 which are molded into the bottom surface of that section. These channels 725 assist in allowing moisture to drain from the mat when the mat is placed on wet or muddy ground. It also provides a more secure footing for the mat on such ground.

Figure 20A:
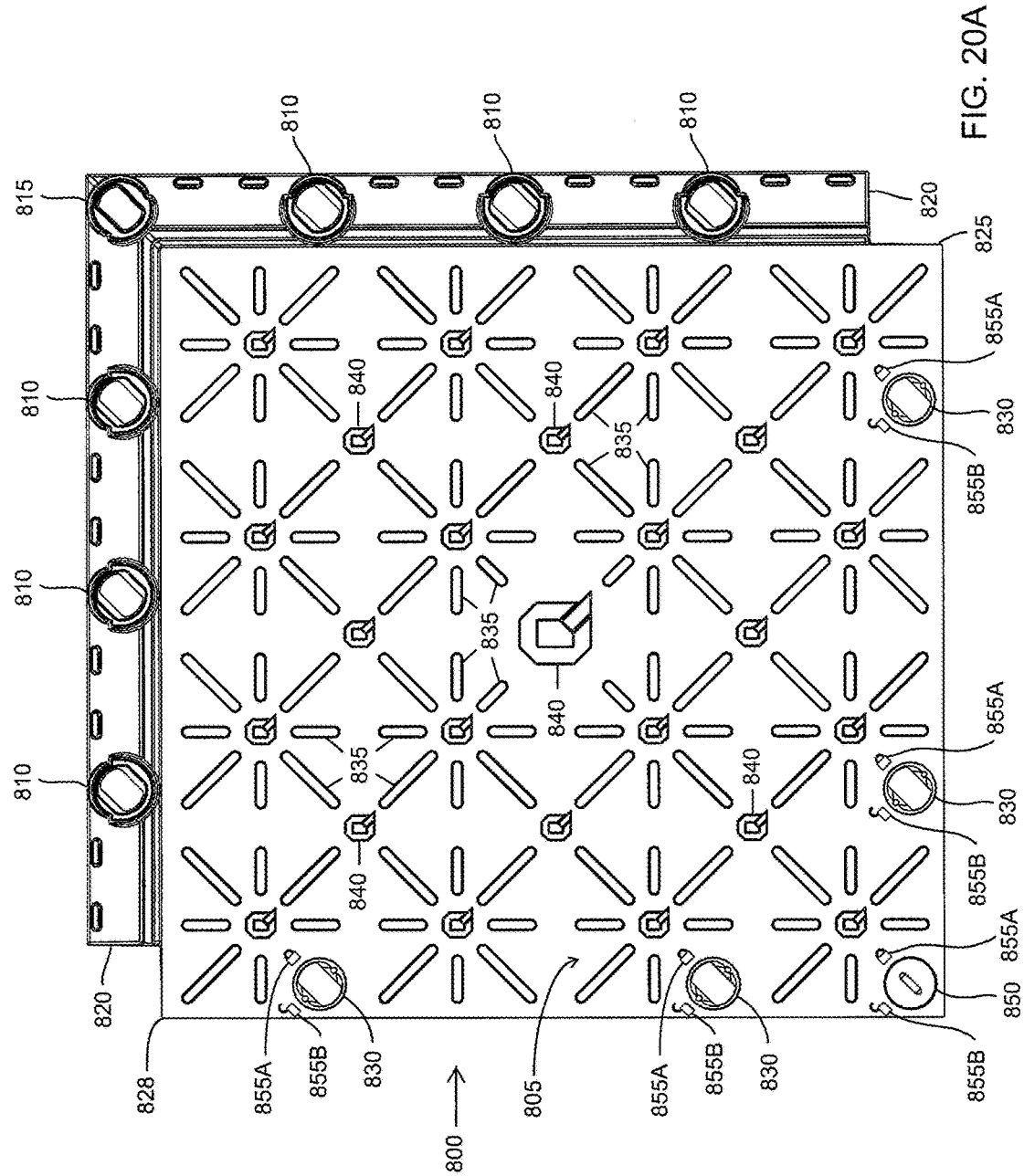
FIG. 20A illustrates a mat that has a different structured upper surface.
Figure 20B:
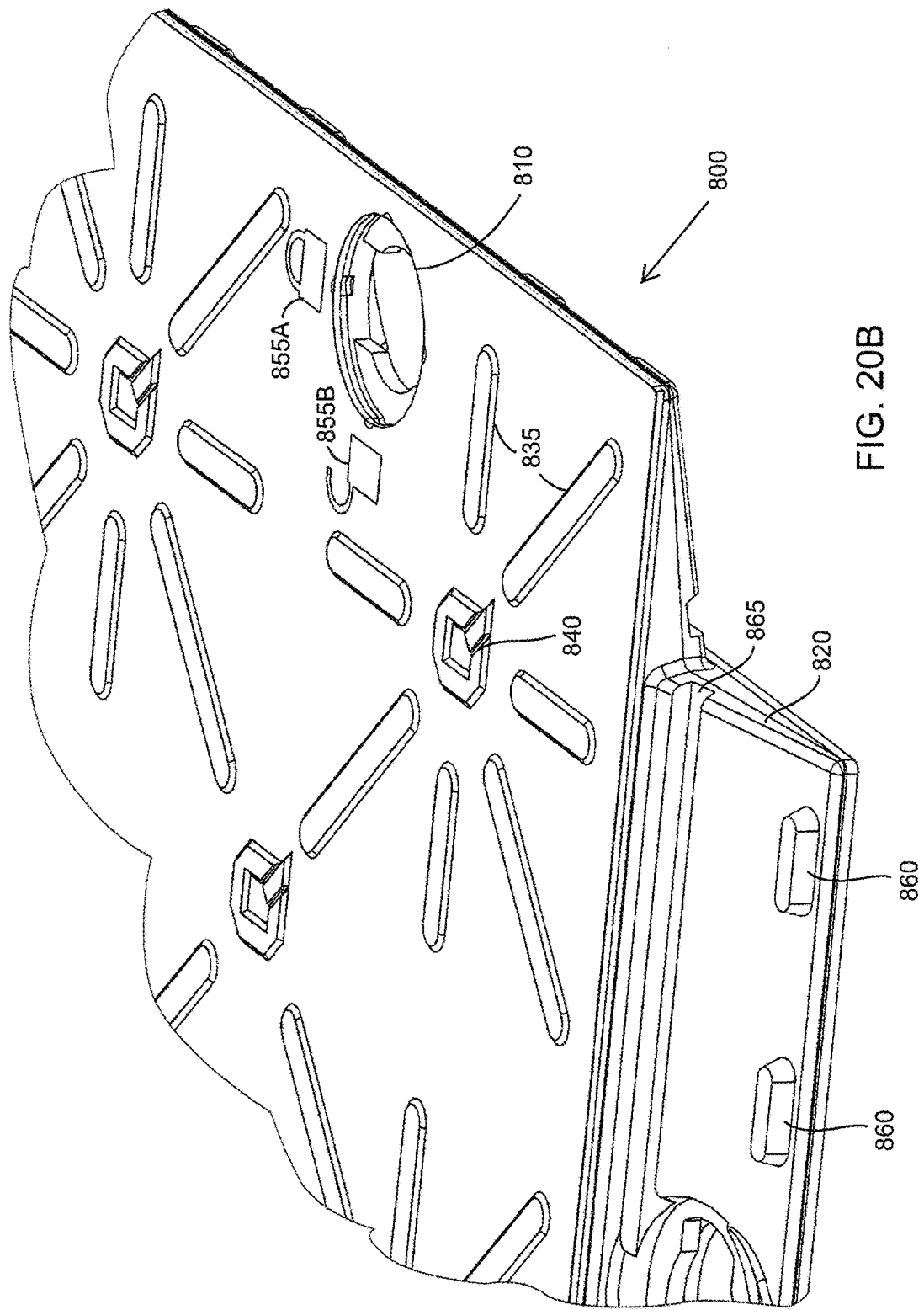
FIG. 20B is an exploded view of a corner of the mat of FIG. 20A.

FIGS. 20A and 20B illustrate a mat 800 that includes an upper surface 805 in the first section that has three openings 810 located on the periphery of two adjacent sides of the mat and one opening 815 in the corner between the two sides. These openings are provided on the lower structures 820 described previously that have a downward sloping bottom surface.

The opposite sides of the mat have the upper structures 825 that includes openings 830 and an upward sloping surface that is configured and dimension to conform precisely to the downward sloped surface of the upper structure 825. The openings on the upper surface of the mat also include indicia 855A, 855B which are used to indicate whether the mats are in a locked position 855A or in an unlocked position 855B when the mats are joined together using a fastening element of a particular cam element.

FIG. 20B illustrates the tab members 860 which are configured in a line at the lower portion of the sloped section of lower structure 820. An upper portion of the sloped surface includes an elongated slot 865. Similarly the lower surface of the upper structure is also sloped and includes the same type of tab members at an upper portion of the slope and the same type of elongated slot at a lower portion of the slope. The tab members of the upper structure are configured to fit into slot 865 of the lower structure 820 when an adjacent mat is to be connected. As the adjacent mat is lowered into position, the tab members 860 of the lower structure 820 are received by the slots of the upper structure thus allowing the upper structure of one mat to be in engagement with the lower structure 820 of the adjacent mat and form a uniformly thick connection for the joined mats. As noted above, tab members are utilized as they are more forgiving and allow lateral movement of the adjacent mat for installation with respect to the other mat, compared to the use of an elongated bar or rib member which fills in the slot and makes it is more difficult to adjust the position of the adjacent mat. In certain applications, however, a bar or rib rather than tab members would be sufficient and can be used as an alternate embodiment. Similarly, it is possible to use multiple separate openings that receive one or more of the tab members although this requires a more precise installation. Also, other arrangements of locating members where one is received in the other can be used instead of the tab members and slots or openings.

The upper surface of the mat has a plurality of elongated bumps 835 which are arranged in a radially expanding manner from a number of central raised members 840 that are preferably distributed uniformly on the mat. These bumps 835 can be of the same length or of different lengths as shown. The central raised members 840 can be in the form of an identifying letter, such as the Q which is shown, to indicate the source of the mat, here Quality Mat. Other indicia or names can be used for raised members 840. Additionally, instead of identifying indicia, openings can be provided which would act as a drain to allow water to be removed from the upper surface through the openings and through the mat.

As shown, the openings on upper structures 825 do not conform precisely to the openings 810, 815 of the lower structures 820. This prevents connection of the mats in an aligned adjacent manner and instead forces the installer to stagger the mats by aligning the openings on the upper structure with those of the lower structures so that the can receive locking cams. Also, to facilitate installation, there are a lesser number of openings on the upper structures 825 than the lower structures, so that a lesser number of locking cams are needed compared to the number of openings on the lower structures 830. This allows the mat designer to select any number of holes on the upper structures for locking into the holes of the lower structures.

Generally, two openings on the upper structures are connected to two openings on the lower structure, namely the corner opening 815 and the adjacent opening on the upper structure, with two adjacent openings on the lower structure.

The present panel mat design thus allows many different connecting options that are configured for increasing the strength of the entire installation so that it acts as a single flooring unit. The arrangement of an odd number of openings in the mat, and in particular with more openings on the lower structures than the upper ones, allow for the mats to be assembled uniformly and if desired staggered.

As shown in FIG. 20A, five openings are provided on the top or upper structures and seven openings provided on the bottom or lower structures. These allow adjacent mats to be assembled by aligning at least some of the openings of the upper structure over the openings of the lower structure. A full adjacent relation occurs when one mat is placed directly adjacent another with two or all three upper openings provided with a locking pin or cam to connect the openings of the upper structure to the openings of the lower structure. As the full adjacent assembly relation results in a line or seam between multiple rows of connected mats, a staggered configurations are preferred. For these, a ⅓, ½ or ⅔ extension overlap can be made depending upon which two openings on the lower structure are overlaid with the corner opening and adjacent opening of the upper structure before providing a locking cam in each pair of openings. And as noted it is not necessary to place a cam in each superimposed opening but only to use as many as needed to obtain a secure connection. This is typically two or possibly three cams per joined structures of the adjacent mats.

The corner opening 815 is important because it helps provide a secure connection between adjacent mats. By holding the corners down through the use of a locking cam in this corner opening 815, the mats are held in a flat condition which avoids the issue of toe jams due to bucking corners which occurs in other mats that do not provide a corner opening to lock.

Another feature of the invention is the arrangement of the top face of the cam 845 and its orientation in the opening 815 as well as with respect to the sides of the mat. The cam 845 has a slot 850 in its upper face to receive a tool or flat head rod that facilitates rotation of the cam. The cam 845 is initially placed into the opening 815 with the slot at a 45 degree angle to the nearest end of the mat. The tool is used to rotate the cam 845 by 90 degrees to lock the mats together. The opening and its internal structure along with the structure of the cam prevent rotation by more than 90 degrees. In particular, the opening 815 in the mat has a stop feature that prevents the cam 845 from turning more than 90 degrees. The cam 845 itself has the same stop feature, so that the cam 845 can only turn 90 degrees from the locked to unlocked positions. The mats are locked together when the pin slot is oriented at an angle of 135 degrees (or −45 degrees) with regard to the nearest end of the mat. This 45 degree association of the pin slots in the body of the cam and mat allow for flexibility in assembly because it minimizes restrictions on the array of assembled mats. Of course, the lock/unlock graphics that are positioned outside of the perimeter of the openings on the top surface of the mat may be located at any point and can be rotated from what is shown. Also, when necessary, the cams 845 can be fully removed from the opening 815 for maintenance, change or alterations.

The staggered arrangements are also useful in controlling the overall width of a floor installation. For a 9 foot square mat, the full connection results in widths that are multiples of 9, while the ⅓ staggered connection results in a 12 foot width for two joined mats, a 15 foot width for three joined mats, etc. For a ⅔ staggered connection, the multiples are 15 feet for two joined mats and 21 feet for three joined mats. For a ½ staggered connection, the multiples are 13.5 feet for two joined mats, 18 feet for three joined mats, etc. The staggering allows different width and length dimensions to be achieved for any particular installation. It is also possible to cut the last mats to be installed to fit to a different width or length dimension that cannot be achieved by the different staggering arrangements. This allows the joined mats to fit the geometry of the site, which typically would be a football field or gymnasium.

The mats can also be joined to form a temporary flooring installation that is discontinuous, i.e., one that leaves certain openings between joined mats. This allows the mats to be placed around trees, light towers or other obstacles that exist in the area that is to be provided with a temporary flooring of joined mats. In particular, it is relatively easy to leave openings such as by simply omitting one or more mats to provide open space in the floor structure. This can serve a number of purposes, such as allowing the floor structure to be installed around a column, pole, post or other upstanding structure, as well as to leave open space for a light tower, camera tower, and video screen support or speaker support tower. Furthermore, in the event that a mat is damaged after installation, it can be unlocked, disconnected and removed for replacement by another similarly sized and configured mat without having to remove all further mats that are connected together in the installation.

Of course, when the upper surface of the first section is structured, the bottom surface of the third section can be similarly structured in a similar manner or with a different type of structure. FIGS. 18 and 19 illustrate a preferred combination of different structures wherein FIG. 18 shows a herringbone pattern on the top surface of the first section while FIG. 19 illustrates linear channels provided on the bottom surface of the third section and FIG. 20A can optionally include openings for removal of water.

The surface patterns and arrangements that are shown in FIG. 20A can be arranged as shown or in any other particular design configuration or arrangement. The indicia can indicate a particular owner or user of the mat and the raised portions can be of different sizes shapes or arrangements provided that the upper surface of the mat is not uniformly flat. The designs can provide a tread surface on the mat to facilitate movement of personnel or equipment over the mat.

The top patterns or structures that are applied to the mats also provide the capability to change out the center section to customize the mat with any particular design for a purchaser of the mat. This enables the costumer to advertise its company name or logo as well as to indicate the user or manufacturer of the mat. And furthermore, it is possible to add wraps, fabrics or coatings of a particular logo onto the upper surfaces of the mat. The logo can be applied to each mat or portions of a logo can be applied to different mats such that when they are connected, a much larger logo is made to provide enhanced visibility.

FIG. 21 illustrates lifting elements 925 four of which are provided on rectangular mat 900, which would typically have a larger size of about 8'×16'. The lifting elements 925 are shown with a lifting ring 930 which is standing vertically in an operative position to be engaged by lifting equipment.

FIGS. 22A and 22B further illustrate this feature. In FIG. 22A, the lifting element is shown with ring 930 in the operative position. Also shown is recess 935 which is configured to have the same shape and depth as ring 930. FIG. 22B illustrates the ring 930 pivoted downwardly to fit within recess 935 so that the upper surface of the mat is generally planar. This would avoid workers tripping over the lifting element if it were not retracted into the surface of the mat.

Figure 23:
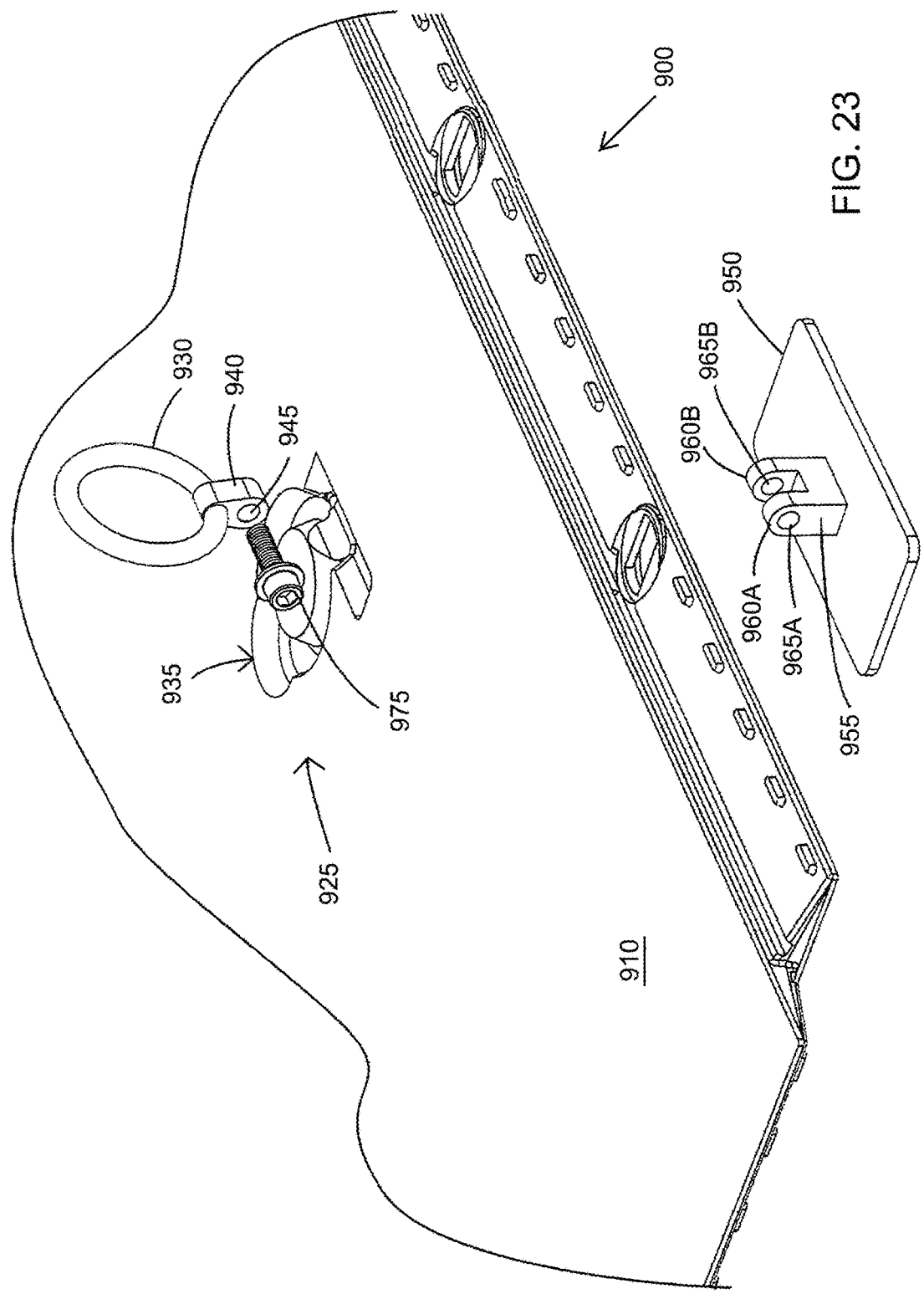
FIG. 23 illustrates a particular construction for the lifting element shown in FIG. 21.

FIG. 23 further illustrates lifting element 925. Also shown is recess 935 which receives lifting ring 930 when pivoted downward into a retracted position so that the surface of the mat is relatively flat. Lifting element 925 includes lifting ring 930 which is mounted on a base member 940 that has a central aperture 945. On the opposite side of mat 900, lifting element includes a base plate 950 with an upstanding post 955 that has two legs 960A and 960B each of which includes an aperture 965A and 965B. The base fits into an elongated opening on the lower surface of the third section 920 so that it is seated therein. Post 955 extends through the mat so that it can align with base member 940 of lifting ring 930. The base member 940 is joined to the legs of the post by a bolt member 975 that passes through apertures 945, 965A and 965B. The bolt member is secured in position either by machine threads which are provided in the apertures or by the use of a nut that engages the opposite end of the bolting member 975.

Figure 24:
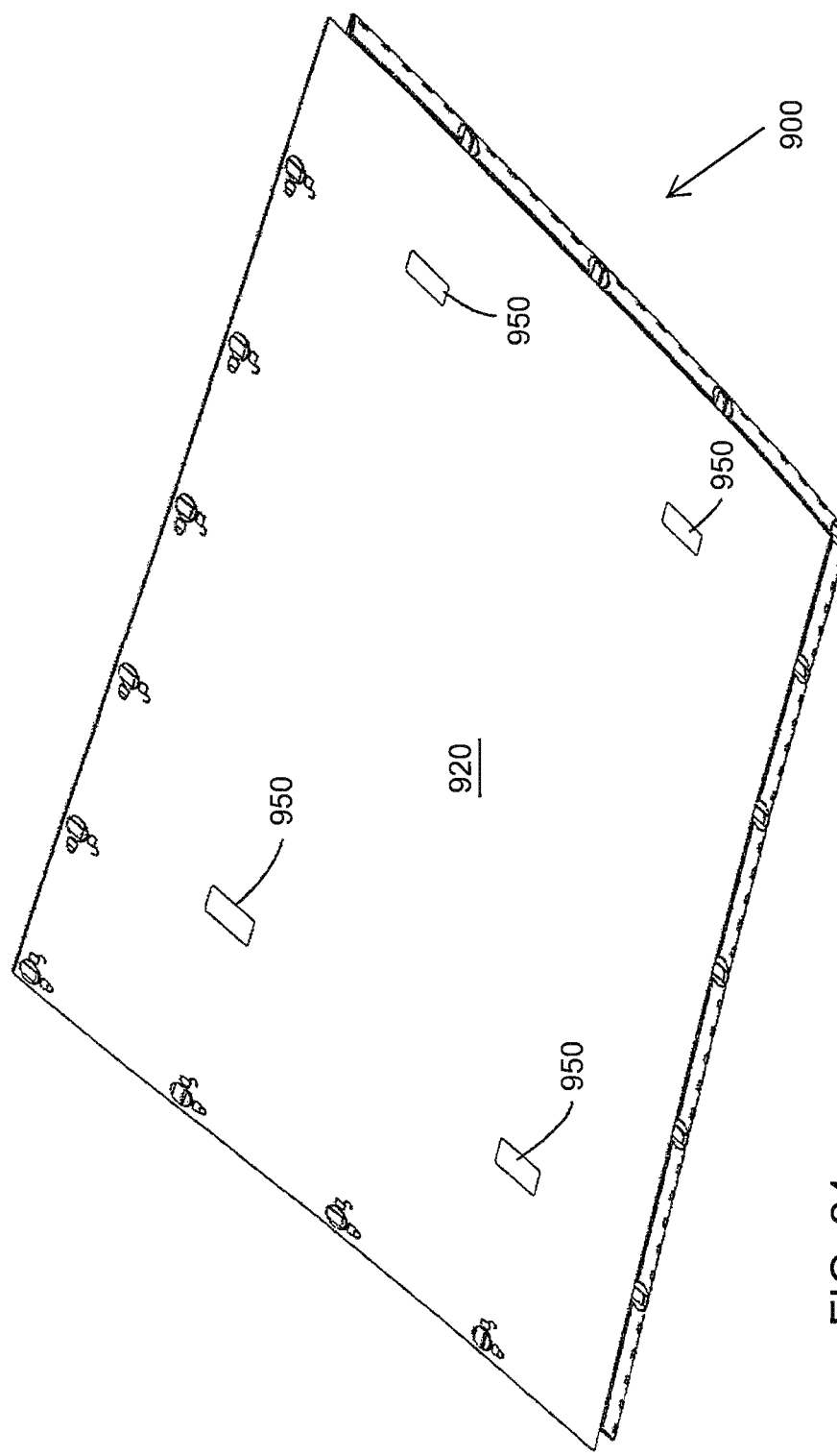
FIG. 24 illustrates the bottom surface of the mat of FIG. 21.

FIG. 24 illustrates base plate 950 in position in the surface of third section 920. While it is not critical that the plate be seated in the surface of section 920, by doing so this provides a smooth flat base for the mat 900.

FIGS. 25A, 25B, and 25C illustrate a variation of lifting element 925. In these figures, lifting element 980 includes a similar construction with lifting element 985 and with a similar base member and post with leg extensions, but the base plate 990 is configured differently. As shown, base plate 990 is circular and includes two cut out portions 995. The base plate and cut out portions are received in recess 937 that includes protrusions 938. The protrusions engage the cut out portions of the base plate so that it can be secured in the recess without rotational movement so that the lifting element can be secured to the mat 900.

FIG. 25B illustrates that this lifting ring 985 maybe positioned to sit in a slot 939 so that the ring can be held in the operative position. After the mat 900 has been lifted or installed, ring 985 can be rotated as shown in FIG. 25C so that it can retreat back into opening 935 as in the preceding embodiment to provide a relatively flat working surface on the mat.

And while these lifting elements 925, 980 are preferred for use with the panel mats of the invention, a number of other designs for such lifting elements can be used. Instead of the circular lifting ring, a D- or U-shaped member can be used with the remaining structure and recesses adjusted accordingly. So long as the lifting element includes an engagement opening that is securely attached to the mat, skilled artisans can configure many different particular arrangements that would provide the necessary performance.

Figure 26A:
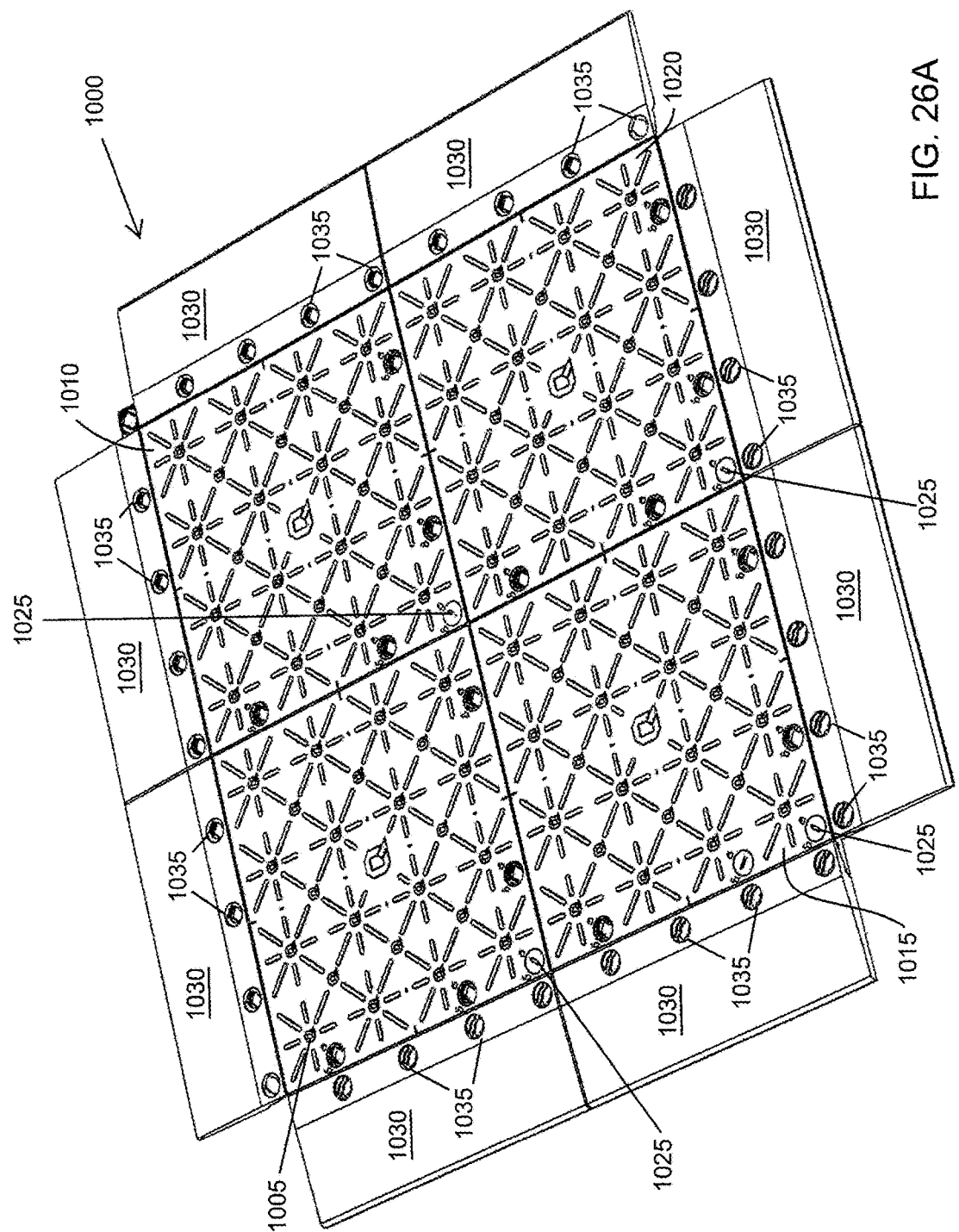
FIG. 26A is a perspective view of a four mat installation that includes side ramps and adapters for connecting the side ramps to the sides of the mats.
Figure 26B:
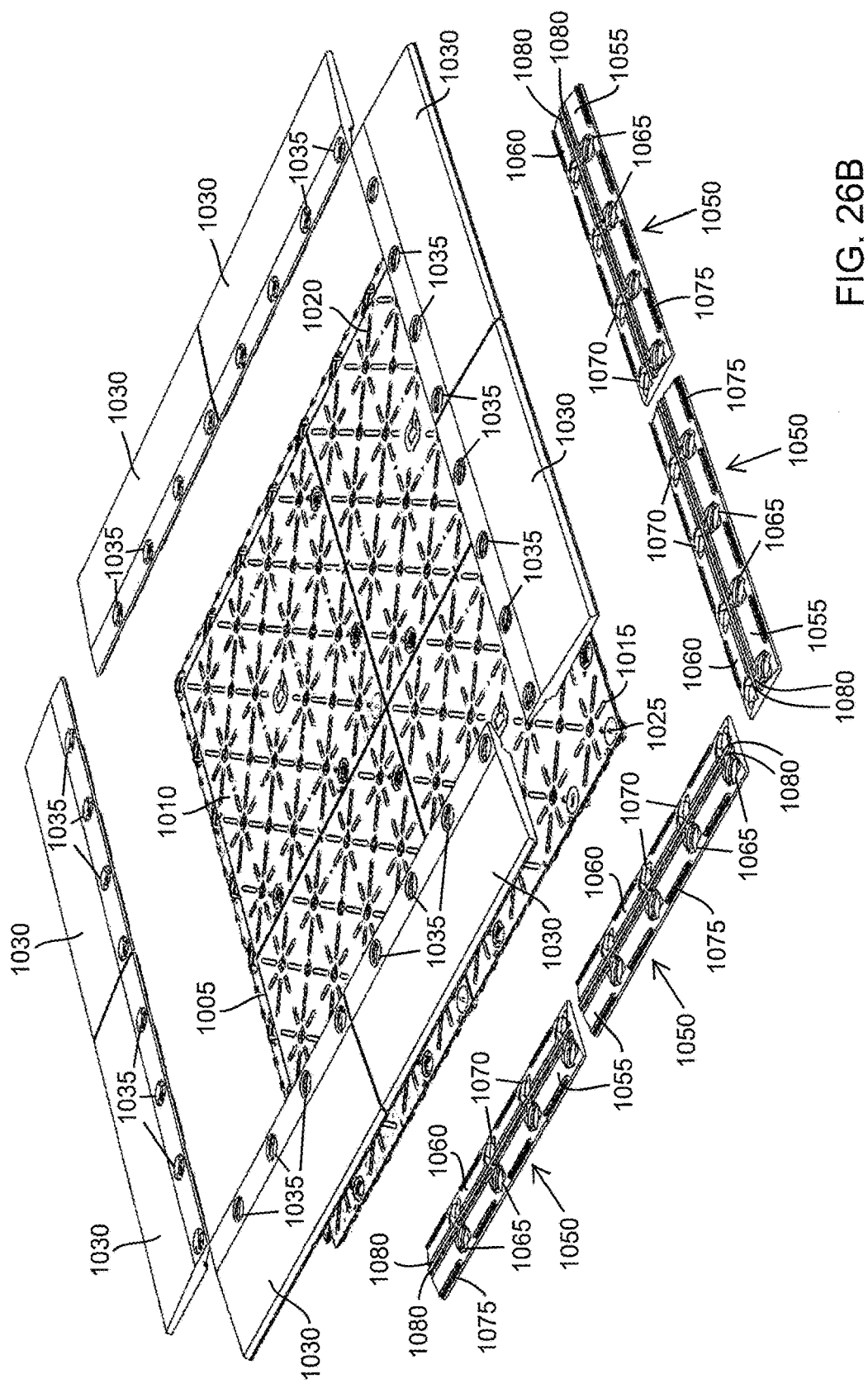
FIG. 26B is an exploded view of a four mat installation of FIG. 26A.

FIGS. 26A and 26B illustrate a temporary flooring installation 1000 made by joining four mats together wherein the mats are configured as shown in FIG. 20A. To prepare this installation, each of the mats 1005, 1010, 1015, 1020 are placed adjacent each other with the upper structures of mats 1005 and 1010 on the bottom sides contacting the lower structures of the top sides of adjacent mats 1015 and 1020 respectively. Also, the upper structures of mats 1010 and 1020 on the left sides contact the lower structures of the right sides of adjacent mats 1005 and 1015 respectively, with locking cams 1025 located in the lower left corners to connect to the mats below.

Each of the four mats includes a side ramp 1030, with eight side ramps being shown so that the upper surface of the temporary flooring made by the four connected mats can be accessed from any side of the structure. These side ramps 1030 provide a slope of $\frac{1}{12}$ to meet American Disability Act requirements, with the length of the ramp determined based on that slope and mat thickness. These side ramps allow and temporary floor structure to be provided with access for wheelchairs or other wheeled devices, such as hand trucks, golf carts, and the like. For mats that have stronger compressive force properties, a forklift or crane can more easily enter onto the mat via the side ramps. Also, the side ramps include a back end 1040 that is configured in the same way as the upper structures of the mats.

To connect the side ramps to the mats, two different options are possible. The lower structures of the top sides of mats 1005 and 1010 receive the sloped upper structures of the back ends 1040 of the side ramps. The same arrangement is possible for the lower structures of the right sides of adjacent mats 1010 and 1020 to respectively connect those to the sloped back ends 1040 of additional side ramps 1030. The back ends 1040 include a number of openings 1045 that are configured in the same manner as openings 810 and 830 of the mats. This allows the pin or locking cam 1025 to join the ramps to those sides of the mats. Thus, ramps are joined to four sides of the mats of the floor structure in this manner, namely, the top sides of mats 1005 and 1010 and the right sides of mats 1010 and 1020.

The other four sides of the floor structure, namely, the left sides of mats 1005 and 1020 and the bottom sides of mats 1015 and 1020 have upper structures which are configured essentially in the same manner as the left side portion 1060 of the side ramps 1030. Therefore, in order to join these mat structures and ramps together, adapters 1050 as shown in FIGS. 26B, 27 and 28 are provided.

The adapters 1050 include right and left side portions 1055, 1060 which are configured in the same manner as the lower structures of the mats. These include tab members 1065, 1070 and slots 1080 to receive the corresponding items of the lower side of the upper structures of the mats. Accordingly, the adapters are placed with one side portion 1060 under the mat where it receives the upper structure of the mat and with the other side portion 1055 receiving the lower side of the back end 1040 of the side ramp 1030. Also, the adapter has openings 1065, 1070 which are configured in the same manner as openings 810, 830 of the mats. This allows the pin or locking cam 1025 to join the mats and side ramps to the respective side portions 1055, 1060 of the adapter 1050. Thus, ramps are joined to four sides of the mats of the floor structure through the adapter 1050 in this manner, namely, the bottom sides of mats 1015 and 1020 and the left sides of mats 1005 and 1015.

The use of the adapters allows different rows of mats to be installed in different directions. Instead of overlapping an upper structure of one mat over a lower structure of an adjacent mat, the adapter 1050 allows the upper structures of two adjacent mats to be connected together through the adapter 1050. This is helpful in large installations such as on a football field wherein one row of mats can be installed on one side of the 50 yard line moving towards the goal line on that side of the field while another row of mats can be placed on the other side of the 50 yard line and installed towards the other goal line. The adapter for this example would be located on the 50 yard line. The adapter is typically not necessary for smaller installations of 4 to 20 mats or even more, but the adapter provides greater flexibility for larger or more complex installations where continuing a single expansion of adjacent mats is more difficult.

The adapters are also helpful in providing support at the ends of the mat for the upper structures. This prevents the upper surface of the mats above the upper structures from having any weak areas on the sides that have upper structures that are not connected above the lower structure of an adjacent mat. The adapter can be used as shown to leave a shorter ramp-type structure or as noted a side ramp can be attached thereto. If the upper surface of the mat is to be supported without extending beyond the end of the mat, a "half adapter" can be used, this being one side of a standard adapter that has been cut in half along a longitudinal center line.

These arrangements protect the upper structures of the mats from damage. They also make a nice, smooth transition for the ramps to the ground for foot or rolling traffic. They make all sides of the mat look similar functionally and aesthetically, as the adapter allows the addition of a side ramp on the sides of the mat that have the upper structures. And as noted, the use of an adapter along the center line of an installation allows bi- or multi-directional installations of a temporary flooring system that connects the mats together so that the installation can proceed in all directions without having to tuck the end of one mat beneath the end of an adjacent mat.

As shown in FIGS. 26A and 26B, each adapter is placed along one side of the mat with ½ of the adapter beneath the mat overhang whereas the ramp extension is provided on the other half of the adapter. When a second adapter is provided on an adjacent side of the mat, there would be an overlap of the adapters at the corner of the mat beneath the corner opening. In this situation, the opening of one of the adapters in the corner can be simply removed by cutting. Alternatively a shorter adapter which does not have structure or a connector opening beneath the corner opening of the mat can instead be used. For each mat, only one of these shorter adapters is needed as the adapter on the adjacent side of the mat can include an opening beneath the corner opening to lock the ramp to the mat. And if a shorter length adapter is not available, the end of a standard adapter can be cut off so that it does not extend beneath the corner opening of the mat.

It is also possible to configure longer length adapters such as an adapter that would have the length of equal to two adjacent mats to facilitate installation. Additionally, an L shaped adapter that has either a single length of the mat or at length of two mats on each leg of the L can be used in certain situations. Generally, however, it is easier to simply have single adapter elements to reduce the number of different links and configurations when transporting such materials to the job site. Also, there are only a maximum of four corners on any particular installation where the adapters would overlap and as noted an adapter with a shorter length that does not extend to and beneath the corner opening would be a more efficient arrangement.

Similarly, it is also possible to configure the side ramps to be of a double length, i.e., the length of two adjacent mats, as that can speed up the installation. As there could be some alignment problems on uneven ground, however, the single length ramps (i.e., that are the same length as the side of the mat) are preferred.

For manufacture or the adapters and side ramps, these can be extruded from the desired plastic or elastomeric material to the appropriate shape and thereafter the openings can be machined or cut into the adapter or ramp.

And while the illustration of the temporary flooring system of FIG. 26A illustrates four connected mats forming a continuous upper surface, a skilled artisan would realize that essentially any number of mats can be combined to provide the desired flooring system. Furthermore, the mats can also be joined to form a temporary flooring installation that is discontinuous, i.e., one that leaves certain openings between joined mats. This allows the mats to be placed around trees, light towers or other obstacles that exist in the area that is to be provided with a temporary flooring of joined mats. The use of the adapters on the sides of the mats that have upper structures adjacent the openings allows those portions of the mats to be more robustly supported. For this, a half adapter can also be used if the flooring system is to terminate exactly at the end of the mat.

The mats themselves can be modified to fit any particular installation. For example, for installing a temporary floor indoors in a gymnasium or on basketball court, there may be situations where the final mats are too wide to fit within the structure. For this, the mats can be cut in half, thirds, quarters, etc. so that the appropriate dimensions are achieved. This can be done prior to shipping the mats to the jobsite or it can be done on-site as the plastic mats can generally be cut easily with a hand or electric saw.

Also, the temporary floor installer would generally know how many mats are needed for a particular installation, as well as the width and length of the area to be protected by the temporary flooring, along with what types of openings may be needed to go around trees, poles, towers, etc. Thus, the installer can provide a kit with the requisite number and sizes of mats, adapters, half adapters, short adapters and side ramps and appropriate locking elements or cams so that the installer or purchaser would obtain everything needed for the installation. Generally, at least 3 cams are provided per mat to join the two upper structures to lower structures of an adjacent mat or to an adapter. One cam would be located in the corner opening of the mat, and one each would be located on the two adjacent sides. The lower structures on the other two sides of the mat are connected from the upper mat structure or side ramp that is placed above it, generally with two cams. Of course, more locking elements could be used depending upon the expected use of the temporary flooring system or to at least have a few spare locking elements in case some are damaged during installation. The kit could also include installation instructions showing how to start the laying and connecting of the mats.

The plastic and elastomeric materials disclosed herein generally have sufficient strength for many applications, but their strength and rigidity can be enhanced by reinforcing the material with appropriate fillers or other materials, such a glass fibers, other particular matter as is generally known in the art. The additional placement of a metal wire, bar, rod or plate into the mold that is used to prepare the sections or in between the sections before they are sealed together can provide further strengthening of the panel mats. Typical metals for such use would be steel, stainless steel or aluminum.

In some embodiments, the panel mats can be made translucent. When these panel mats are to be used outdoors and the mat materials are not sufficiently resistant to withstand long term exposure to sunlight, appropriate additives to improve the UV resistance of the material can be included.

The panel mats can be provided in different sizes, but generally, square mats or rectangular mats having longitudinal sides that are twice as long as the mat width are preferred. The thickness of the mat can vary depending upon the intended use of the mat. As noted herein, the thickness also determines the size of the side ramp angled portion. Also, the thickness is determined based on the thickness of each of the first, second and third sections. These can be varied as desired for the intended application, with thicker first and third sections and perpendicular cell walls in the second section being used for heavier load bearing installations.

The panel mats can be made with different materials and reinforcements for different applications. As the outer surfaces of the mats may be very similar in appearance, it is not readily observable as to which panel mat has a particular construction. For this reason, another aspect of the invention relates to the providing of each mat with identification means that indicates the material, reinforcement and construction of the panel mat. Thus, when a number of different panel mats are maintained in an inventory, the identification means enables operators to readily determine which mats have the particular materials and properties needed for a particular end use, so that the correct mats can be selected and provided to a jobsite for use by the customer. This would be necessary whether the mats are being purchased by the customer or whether the mats are being leased for use.

There are a number of ways to identify the different materials and properties of a mat depending upon the specific type of identification means that are applied to the mat. The preferred types of identification means include an external color code, a radio frequency identification (RFID) tag, or an alphanumeric indicator applied to an outer surface of the mat or that is provided upon a plate that is applied to an outer surface of the mat. The simplest identification means to use is an external color code that is placed upon the mat, preferably in an area that does not receive much abrasion or wear. Different colors or strips or color combinations can be used to identify different materials. And it is highly useful to apply the color code to the same relative positions on each mat for easy identification. For example, placing the external color code along a longitudinal side of each mat allows the color coding to be visible when the mats are stacked upon each other. This simple visual confirmation can be used to make sure that the proper mats are selected: even when the mats are just stacked in the work yard, one can see which ones have the correct color code for the desired core construction.

Another use of color can be to identify certain panel mats that are to be used only by a particular customer. This would assist in making sure that the mats are properly collected and delivered. This color can be an additional color beyond that which is used to identify the mat core, or the mats can have a single unique color or color pattern (e.g., stripes, dots etc.) that identifies both the customer and the mat core. And further, the color can be provided in a particular location or area to confirm who the customer is to assist in quality control regarding the correct shipping and delivery of the mats.

A simpler type of identification means is one that comprises an external alphanumeric indicator that is applied to an outer surface of the mat or that is provided upon a plate that is applied to an outer surface of the mat. These can be carved, burnished or stamped into or onto the mat again is a location that is not expected to experience severe abrasion or wear. This can also be used to identify a particular customer.

For installations over a grass field or yard, the mat can be made to be transparent or translucent so that sunlight is able to pass through the mat to help condition the grass. Additionally, no third section is generally provided for such applications as to open bottoms of the cells provide a smaller "footprint" on the grass to minimize compression of the entire grass surface as would occur if a mat having a bottom plate or sheet would be used. These and the other panel mats disclosed herein are useful to provide temporary flooring for concerts, sporting events, commencement and graduation events, and the like that require a smaller footprint than a full football or baseball field.

And as noted herein, in addition to the mat identification means, each mat can further be provided with a surface color that indicates a potential use or non-use of the mat. This can assist in allowing personnel to properly operate on the mat and to promote safety. These colors can include, for example, red to indicate that portions of the mat need to be kept free of equipment, yellow for indicating that caution is needed, green to indicate portions of the mat that are designed to accommodate travel or movement by trucks or heavy equipment over the mat.

Of course other colors can be used in any of the foregoing embodiments according to a particular code or correspondence of each color to a specific use or prohibited use. These colors can be tailored to the mat user's particular requirements so that work operations upon or around the mats can be optimized for safety, efficiency and expediency. Coloring can also be used to define certain areas of the worksite or to help the mats blend into surrounding areas, so that the jobsite can look as clean and undisturbed as possible. For these reasons the use of conventional paints and other surface coatings enhance the usefulness of the mats for any particular application. These paints or coatings would need to be compatible to bond with the materials of the mat. If necessary, appropriate primers or other chemicals can be used to assure strong bonding of the paints or coatings to the mats.

And in another embodiment, the upper surface of the mat may be provided with a portion of a word or design, such as the name, nickname or abbreviation, mascot or emblem of a school or university. Typically, the desired word or design is incorporated into the material that forms the top section of the mat. This can be done in any one of a number of ways that are known to skilled artisans in the plastic or elastomeric molding field. Thus, after the mats are installed, the word or design can be visible on the temporary flooring. For example, installation on a football field can include the school name or emblem on the temporary flooring in the same location as it would be on the field, so that person observing the installation from the stands can view the name or emblem. This is particularly useful for graduations or other events requiring a large temporary flooring area for chair seating or marching processions wherein the temporary flooring protects the field.

Alternatively, for mats that are to be re-used, the portions of the words or designs on a particular mat that makes up the temporary flooring can be painted onto the mat, built into the plastic during molding of the mat, or provided as a wrapping or film that is applied onto the mat. When painted onto the mat surface, a clear protective layer can be provided above the painted surface to protect the design from abrasion due to movement of chairs or people over the mat.

Additionally, the words or designs can be logos or artwork applied on top of the mats. These can be provided as a film or sheet that is adhered to the mat surface. Preferably, for outdoor use, the film or sheet would also provide a non-skid surface and would be strong enough to bond and not peel off when exposed to various weather conditions.

Of course for any particular word, logo emblem of other design that is to be provided, a specific arrangement of the mats during installation is required. This can be achieved by numbering the mats so that they are installed in the right order and location so that the logo appears properly and correctly. And if the mats are to be used for different installations at different schools, only the mats that contain the emblem or logo need to be changed out and replaced with a different logo or emblem to customize the mat for use at the different school.

The preferred sizes of the panel mats of the invention generally range from 1'×1' to 12'×12' with rectangular and preferable square arrangements preferred. In certain instances, larger size mats of as large as 8 feet wide by 16 feet long may be provided for a specific end use. These larger size mats will need to be moved and installed by equipment rather than individual workers. For this, they would include lifting elements of the types disclosed herein. They also may require specific vehicles for shipping and transport of the panel mats to and from a job site. For this reason, the smaller sizes of the mats (from 2 by 2 feet to 4 by 4" square or 2 by 4 to 4 by 8 feet rectangular mats are preferred as being the most versatile for many manually installed applications. In addition to being sufficiently lightweight to be installed by personnel, they also are easy to ship via conventional vehicles such as trucks or tractor trailers.

Therefore, in sum, it is to be realized that the optimum dimensional relationships for the parts of the invention can include variations and tolerances in size, materials, shape, form, function and use are deemed readily apparent and obvious to the skilled artisan, and all equivalent relationships to those illustrated in the drawings and described in the specification are intended to be encompassed by the claims appended hereto.

Unless defined otherwise, all technical and scientific terms used herein have same meaning as commonly understood by one of ordinary skill in the art to which this invention belongs. Also, as used herein and in the appended claims, the singular form "a", "and", and "the" include plural referents unless the context clearly dictates otherwise. All technical and scientific terms used herein have the same meaning.

The foregoing detailed description is considered as illustrative only of the principles of the invention. Further, since numerous modifications and changes will readily be apparent to those having ordinary skill in the art, it is not desired to limit the invention to the exact constructions demonstrated. Accordingly, all suitable modifications and equivalents may be resorted to falling within the scope of the invention.

What is claimed is:

1. A combination of a lightweight universal panel mat made of plastic or elastomeric material and designed to be interlocked with additional panel mats of similar configurations, and an adapter, or the adapter and a side ramp comprising:

a first section having an upper surface that forms a top surface of the panel mat and is relatively flat, textured or structured to facilitate movement over the upper surface;

a second section having geometry that includes a plurality of cells having a polygonal, circular or elliptical sidewall shape that is open or wherein some or all of the cells have flat top surfaces with the geometry supporting the first section and providing a plurality of open lower surfaces;

first, second, third and fourth sides forming a perimeter of the mat, wherein:

the first and second sides are adjacent and each includes an upper structure that has an upper surface that extends the top surface of the mat and a lower surface that slopes downwardly towards the bottom surface of the mat;

the third and fourth sides are adjacent and each includes a lower structure that has a lower surface that extends the bottom surface of the mat and an upper surface that slopes upwardly towards the top surface of the mat;

each upper and lower structure includes at least one opening passing therethrough;

wherein the downwardly sloped lower surface of the upper structure and the upwardly sloped upper surface of the lower structure are configured to allow for overlapping with respective lower and upper structures of other like mats when placed adjacent thereto for joining therewith by which the overlapped upper and lower structures form a generally flat continuous top and bottom surface of the overlapped mats;

wherein the upper surface of the first section is generally rectangular of length L and width W where L and W each may be any value between 1 foot and 12 feet; and wherein the first and second sections are welded or bonded together to form a unitary panel mat;

wherein the side ramp comprises upper and lower surfaces, with the lower surface configured with a downward slope that corresponds to the downward slope of the lower structure of the mat, and one or more openings therein that correspond and align with the one or more openings of the mat, wherein the openings are configured to interlock or to receive a fastening device therein to so the side ramp can be connected to the mat; and/or wherein the adapter is configured to be connected to the mat, the side ramp, or to both the mat and side ramp, with the adapter comprising an elongated member having first and second sides and an upper surface that has first and second upwardly sloping portions extending respectively from the first and second sides of the elongated member to form first and second sloped surfaces, wherein one sloped surface of the adapter conforms to the upwardly sloped upper surface of the mat and the other sloped surface of the adapter conforms to the lower sloped structure of the side ramp.

2. The combination of claim 1, wherein the first section of the panel mat has a relatively flat lower surface for contacting the cell sidewalls or closed tops of some or all of the cells of the second section and the first and second sections are molded together into a single component.

3. The combination of claim 1, wherein the panel mat further comprises one or more alignment tabs and one or more tab receiving slots with the tab(s) provided in one of the upper or lower structures and with the slot(s) provided in the other of the upper or lower structures, wherein each upper and lower structure includes a plurality of spaced openings with the openings of the upper and lower structures configured to be in alignment when overlapping the respective lower and upper structures of other like mats using the alignment tabs and slots; and wherein the openings are configured to interlock or to receive a fastening device therein when aligned to assist in more securely holding overlapped mats together.

4. The combination of claim 3, wherein in each upper and lower structure of the panel mat one opening is located in a corner of the mat between the adjacent first and second sides and another opening is located in a corner of the adjacent third and fourth sides.

5. The combination of claim 1, wherein the upper surface of the first section of the panel mat is a structured surface that includes a raised pattern of spaced elements in a pattern, and wherein the open lower surfaces of the cells of the second section provide a secure footing when the panel mat is placed on wet or muddy ground, with some or all of the cells having top surfaces that extend to and support the upper surface of the first section to strengthen that surface of the panel mat.

6. The combination of claim 1, wherein the panel mat further comprises a third section located below and welded, molded, bonded, joined or sealed together to the second section, the third section configured and dimensioned to close off the openings of the cells and form a bottom surface for the panel mat that is relatively flat, textured or structured with the panel mat being able to withstand point loads of between 300 and 500 psi and spread loadings of 40,000 to 50,000 pounds per square foot.

7. The combination of claim 6, wherein the upper surface of the first section is relatively flat and the third section is a relatively flat plate, so that the bottom surface of the third section is also relatively flat.

8. The combination of claim 6, wherein the top surface of the first section, the bottom surface of the third section, or both surfaces include channels that assist in allowing drainage of water from that surface of the mat, with the channels molded therein or formed between a plurality of raised islands, elongated bumps or protrusions, raised indicia, other surface features, or combinations thereof.

9. The combination of claim 1, wherein the upper surface of the first section of the panel mat is a structured surface that includes a plurality of raised islands spaced by and closely arranged, with the islands having a polygonal, circular, or elliptical shape; and wherein the cells of the second section have top surfaces that are configured in the same shape as the islands and extend to and within the islands to support the upper surface of the first section to strengthen the panel mat.

10. The combination of claim 1, wherein the panel mat is either rectangular wherein W=2L or square wherein W=L, and wherein L is preferably 2.5, 3, 3.5, 4, 4.5, 5, 6, 7, or 8 feet and W is preferably 2.5, 3, 3.5, 4, 4.5, 5, 6, 7, 8, 9, 10, 12, 14 or 16.

11. The combination of claim 1, wherein the mat further comprises one, two, three or four lifting elements that are affixed to the mat to allow lifting and installation or reclamation of the mat, with the lifting element including (a) a ring or U or D shaped member that is movable between first and second positions, wherein the first position is one where the member resides below the surface of the mat and the second position is an operative position where the ring or U or D shaped member is exposed for engagement with lifting equipment, and (b) a structure that secures the ring or U or D shaped member to the mat.

12. The combination of claim 1, wherein each upper and lower structure of the mats further includes spaced openings with the openings of the upper and lower structures configured to be in alignment when overlapping the respective lower and upper structures of adjacent mats; and wherein the openings are configured to interlock or to receive a fastening device therein to assist in more securely holding overlapped mats together, and wherein in each upper and lower structure one opening is located in a corner of the mat between the adjacent first and second sides and another opening is located in a corner of the adjacent third and fourth sides.

13. The combination of claim 1, which includes:
one or more side ramps that facilitate smooth access to the upper surface of a mat by wheelchairs or other wheeled articles; and
a separate adapter for each ramp wherein each adapter is connected to both the mat and the side ramp, wherein the ramps have sloped bottom surfaces that align with the upwardly sloped upper surface of the lower structure and the adapter has an upper surface with two sloped portions, one that aligns with the downwardly sloped lower surface of the upper structure of the mats and the other that aligns with the sloped bottom surfaces of the ramps.

14. The invention of claim 13 wherein the upper surface is configured to have a slope of 1/12 to meet American Disability Act requirements, with the length of the ramp determined based on that slope and mat thickness.

15. A lightweight universal panel mat made of plastic or elastomeric material and having similar configurations, with each mat comprising:
a first section having an upper surface that forms a top surface of the panel mat and is relatively flat, textured or structured to facilitate movement over the upper surface;
a second section having geometry that includes a plurality of cells having a polygonal, circular or elliptical sidewall shape that is open or wherein some or all of the cells have flat top surfaces with the geometry supporting the first section and providing a plurality of open lower surfaces;
first, second, third and fourth sides forming a perimeter of the mat, wherein:
the first and second sides are adjacent and each includes an upper structure that has an upper surface that extends the top surface of the mat and a lower surface that slopes downwardly towards the bottom surface of the mat;
the third and fourth sides are adjacent and each includes a lower structure that has a lower surface that extends the bottom surface of the mat and an upper surface that slopes upwardly towards the top surface of the mat;
each upper and lower structure includes at least one opening passing therethrough;
wherein the downwardly sloped lower surface of the upper structure and the upwardly sloped upper surface of the lower structure are configured to allow for overlapping with respective lower and upper structures of other like mats when placed adjacent thereto for joining therewith by which the overlapped upper and lower structures form a generally flat continuous top and bottom surface of the overlapped mats;
wherein the upper surface of the first section is generally rectangular of length L and width W where L and W each may be any value between 1 foot and 12 feet; and
wherein the first and second sections are welded or bonded together to form a unitary panel mat;
wherein a total of only five openings are provided on the upper structures, three openings on each upper structure with a common corner opening, and a total of only seven openings are provided on the lower structures, four openings on each lower structure with a common corner opening, to allow adjacent mats to be assembled by aligning at least some of the openings of the upper structure over the openings of the lower structure in multiple locations including either in a full adjacent relation, or in a staggered configuration wherein adjacent mats are arranged in a 1/3, 1/2 or 2/3 extension overlap depending upon which two openings on the lower structure are overlaid with the corner opening and adjacent opening of the upper structure before receiving a fastening device therein in each overlaid pair of openings.

16. A temporary support surface, deck, walkway or roadway comprising a plurality of overlapped lightweight panel mats according to claim 15;
wherein the openings of the upper and lower structures of the mats are configured to interlock or to receive a fastening device, and wherein a total of only five openings are provided on the upper structures, three openings on each upper structure with a common corner opening, and a total of only seven openings are provided on the lower structures, four openings on each lower structure with a common corner opening, to allow adjacent mats to be assembled by aligning at least some of the openings of the upper structure over the openings of the lower structure in multiple locations including either in a full adjacent relation, or in a staggered configuration wherein adjacent mats are arranged in a 1/3, 1/2 or 2/3 extension overlap depending upon which two openings on the lower structure are overlaid with the corner opening and adjacent opening of the upper structure before receiving a fastening device therein in each overlaid pair of openings.

17. The invention of claim 16, wherein the fastening device is a cam, pin, stake, bolt, clamp, screw, clip, or peg which is configured to be received in the aligned openings of the upper and lower structures and which lock those structures together.

18. The invention of claim 17, wherein the fastening device is a cam that includes a first locking tab that when rotated engages an opening in an adjacent mat to interlock the mats together, and wherein the upper surface of each mat includes indicia adjacent each opening to indicate whether the cam is in a locked or unlocked position.

19. The mat of claim 15, wherein the upper surface of the first section is a structured surface that includes a raised pattern of spaced elements in a pattern, and wherein the open lower surfaces of the cells of the second section provide a secure footing when the panel mat is placed on wet or muddy ground, with some or all of the cells having top surfaces that extend to and support the upper surface of the first section to strengthen that surface of the panel mat.

20. A combination comprising a lightweight universal panel mat made of plastic or elastomeric material and designed to be interlocked with additional panel mats of similar configurations, a side ramp and an adapter, the panel mat comprising:
a first section having an upper surface that forms a top surface of the panel mat and is relatively flat, textured or structured to facilitate movement over the upper surface;
a second section having geometry that includes a plurality of cells having a polygonal, circular or elliptical sidewall shape that is open or wherein some or all of the cells have flat top surfaces with the geometry supporting the first section and providing a plurality of open lower surfaces;
first, second, third and fourth sides forming a perimeter of the mat, wherein:
the first and second sides are adjacent and each includes an upper structure that has an upper surface that extends the top surface of the mat and a lower surface that slopes downwardly towards the bottom surface of the mat;

the third and fourth sides are adjacent and each includes a lower structure that has a lower surface that extends the bottom surface of the mat and an upper surface that slopes upwardly towards the top surface of the mat;

each upper and lower structure includes at least one opening passing therethrough;

wherein the downwardly sloped lower surface of the upper structure and the upwardly sloped upper surface of the lower structure are configured to allow for overlapping with respective lower and upper structures of other like mats when placed adjacent thereto for joining therewith by which the overlapped upper and lower structures form a generally flat continuous top and bottom surface of the overlapped mats;

wherein the upper surface of the first section is generally rectangular of length L and width W where L and W each may be any value between 1 foot and 12 feet; and wherein the first and second sections are welded or bonded together to form a unitary panel mat;

wherein the adapter is configured to be connected to either the mat, the side ramp or to both, wherein the side ramp includes upper and lower surfaces, wherein the lower surface is configured with a downward slope that corresponds to the downward slope of the lower structure of the mat; and one or more openings therein that correspond and align with the one or more openings of the mat; wherein the openings are configured to interlock or to receive a fastening device therein to so the side ramp can be connected to the mat, and the adapter comprises an elongated member having first and second sides and an upper surface that has first and second upwardly sloping portions extending respectively from the first and second sides of the elongated member to form first and second sloped surfaces, wherein one sloped surface of the adapter conforms to the upwardly sloped upper surface of the mat and the other sloped surface of the adapter conforms to the lower sloped structure of the side ramp.

* * * * *